United States Patent
Meroueh et al.

(10) Patent No.: US 10,870,784 B2
(45) Date of Patent: Dec. 22, 2020

(54) SYSTEM FOR DIRECT ELECTRICAL CHARGING AND STORAGE OF THERMAL ENERGY FOR POWER PLANTS

(71) Applicant: Massachusetts Institute of Technology, Cambridge, MA (US)

(72) Inventors: Laureen Meroueh, Cambridge, MA (US); Gang Chen, Carlisle, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 14 days.

(21) Appl. No.: 16/313,881

(22) PCT Filed: Jul. 24, 2017

(86) PCT No.: PCT/US2017/043474
§ 371 (c)(1),
(2) Date: Dec. 27, 2018

(87) PCT Pub. No.: WO2018/101989
PCT Pub. Date: Jun. 7, 2018

(65) Prior Publication Data
US 2019/0153284 A1 May 23, 2019

Related U.S. Application Data

(60) Provisional application No. 62/428,074, filed on Nov. 30, 2016.

(51) Int. Cl.
*C09K 5/06* (2006.01)
*F02C 1/05* (2006.01)
(Continued)

(52) U.S. Cl.
CPC .............. *C09K 5/063* (2013.01); *F02C 1/05* (2013.01); *F02C 6/00* (2013.01); *F02C 6/14* (2013.01);
(Continued)

(58) Field of Classification Search
CPC ......... C09K 5/063; F02G 1/055; F02G 1/043; F03G 6/068; F03G 6/065; F03G 6/06;
(Continued)

(56) References Cited

U.S. PATENT DOCUMENTS

| | | | |
|---|---|---|---|
| 5,873,250 A | 2/1999 | Lewis et al. | |
| 2006/0201148 A1* | 9/2006 | Zabtcioglu | F01K 17/02 60/508 |

(Continued)

FOREIGN PATENT DOCUMENTS

| WO | 2016/154784 A1 | 10/2016 |
|---|---|---|
| WO | 2018/170533 A1 | 9/2018 |

OTHER PUBLICATIONS

[No Author Listed] "1414 Degrees Solutions" (6 pages).
(Continued)

*Primary Examiner* — Hoang M Nguyen
(74) *Attorney, Agent, or Firm* — Nutter McClennen & Fish LLP

(57) ABSTRACT

System for storage of electricity in the form of thermal energy, and release of thermal energy during times of demand. The system includes a unit for containing at least one electrically conducting phase change material and electrical circuitry for driving electrical current through the phase change material to heat the phase change material into a molten state, or at least one electrical heater used to convert electricity into heat stored in the phase change material. Structure is provided for transferring heat in the phase change material to a working fluid such as steam or gas for electricity generation in a steam turbine or gas turbine, capable of generating supercritical fluids. Structure is also provided for transferring heat in the phase change material to a thermal energy to electrical energy conversion
(Continued)

device. A suitable phase change material is elemental silicon or an aluminum-silicon alloy.

25 Claims, 18 Drawing Sheets

(51) Int. Cl.
| | |
|---|---|
| F02C 6/14 | (2006.01) |
| F28D 20/02 | (2006.01) |
| F02C 6/00 | (2006.01) |
| F03G 6/02 | (2006.01) |
| F03G 6/00 | (2006.01) |
| F03G 6/06 | (2006.01) |
| F02G 1/043 | (2006.01) |
| F02G 1/055 | (2006.01) |

(52) U.S. Cl.
CPC ............ *F02G 1/043* (2013.01); *F02G 1/055* (2013.01); *F03G 6/00* (2013.01); *F03G 6/001* (2013.01); *F03G 6/003* (2013.01); *F03G 6/02* (2013.01); *F03G 6/06* (2013.01); *F03G 6/064* (2013.01); *F03G 6/065* (2013.01); *F03G 6/068* (2013.01); *F28D 20/021* (2013.01); *Y02E 20/14* (2013.01); *Y02E 60/14* (2013.01); *Y02P 20/54* (2015.11)

(58) Field of Classification Search
CPC . F03G 6/064; F03G 6/00; F03G 6/003; F03G 6/001; F03G 6/02; F02C 6/00; F02C 6/14; F02C 1/05; F28D 20/021; Y02E 60/145; Y02E 20/14; Y02P 20/544
USPC ........... 60/641.8–641.15, 650, 682–684, 517
See application file for complete search history.

(56) References Cited

U.S. PATENT DOCUMENTS

| | | | | |
|---|---|---|---|---|
| 2008/0276616 | A1* | 11/2008 | Flynn | F01K 3/12 60/641.15 |
| 2010/0212656 | A1* | 8/2010 | Qiu | F03G 6/06 126/618 |
| 2011/0068575 | A1* | 3/2011 | Zabtcioglu | F01K 17/02 290/2 |
| 2011/0314812 | A1 | 12/2011 | Sonwane | |
| 2012/0227926 | A1* | 9/2012 | Field | F28D 20/02 165/10 |
| 2012/0319410 | A1 | 12/2012 | Ambrosek et al. | |
| 2013/0044474 | A1* | 2/2013 | Aikala | A01G 7/045 362/231 |
| 2013/0340432 | A1 | 12/2013 | Hunt et al. | |
| 2014/0000583 | A1 | 1/2014 | Kotze | |
| 2015/0053367 | A1 | 2/2015 | Parkinson et al. | |
| 2015/0267612 | A1* | 9/2015 | Bannari | F01D 15/02 60/650 |
| 2016/0197574 | A1 | 7/2016 | Henry | |

OTHER PUBLICATIONS

[No Author Listed] "Siemens presents thermal storage solution for wind energy," Siemens Press Release, Hamburg, Sep. 27, 2016, Germany (4 pages).

[No Author Listed] HITEC® Heat Transfer Salt, Coastal Chemical Co, LLC, 2009 (10 pages).

Al-Sulaiman, FA et al., "Performance comparison of different supercritical carbon dioxide Brayton circles integrated with a solar power tower," Energy, vol. 82, pp. 61-71, Mar. 15, 2015 (11 pages).

Bartels, J, "Supercritical Pressure Steam Power Cycles.", Proceedings of the American Power Conference, Illinois Institute of Technology, vol. 16, p. 166, 1954 (8 pages).

Beér, JM, "High efficiency electric power generation: the environmental role," Progress in Energy and Combustion Science, vol. 33, pp. 107-134, 2007 (28 pages).

Brandt, R et al., "Electrical resistivity and thermal conductivity of pure aluminium and aluminum alloys up to and above the melting temperature," International Journal of Thermophysics, vol. 28, No. 5, pp. 1429-1446, Oct. 2007 (18 pages).

Bugge, J, et al., "High-efficiency coal-fired power plants development and perspectives," Energy, vol. 31, pp. 1437-1445, 2006 (9 pages).

Chum, HL et al., "Review of thermally regenerative electrochemical systems," Solar Energy Research Institute, Golden, CO (USA), 1981 (73 pages).

Datas, A et al., "Ultra high temperature latent heat energy storage and thermophotovoltaic energy conversion," Energy, vol. 107, pp. 542-549, 2016 (8 pages).

Dunn, B et al., "Electrical Energy Storage for the Grid: A Battery of Choices," Science, vol. 334, pp. 928-935, Nov. 18, 2011 (9 pages).

Evans, A et al., "Assessment of utility energy storage options for increased renewable energy penetration.", Renewable and Sustainable Energy Reviews, vol. 16, Issue 6, pp. 4141-4147, Aug. 2012 (7 pages).

Fabbri, M et al., "Experimental and Numerical Analysis of DC Induction Heating of Aluminum Bullets.", IEEE Transactions on Magnetics, vol. 45, Issue 1, pp. 192-200, 2009 (9 pages).

Fanone, E et al., "The case of negative day-ahead electricity prices," Oct. 2011 (46 pages).

Ferreira, HL et al., "Characterisation of electrical energy storage technologies.", Energy, vol. 53, pp. 288-298, 2013 (11 pages).

Forsberg, C et al., "Converting excess low-price electricity into high-temperature stored heat for industry and high-value electricity production," The Electricity Journal, vol. 30, pp. 42-45, 2017 (11 pages).

Forsberg, C., "Hybrid systems to address seasonal mismatches between electricity production and demand in nuclear renewable electrical grids," Energy Policy, vol. 62, pp. 333-341, Nov. 2013 (9 pages).

Fortunato, B et al., "Simple Mathematical Model of a Thermal Storage with PCM.", AASRI Procedia, vol. 2, pp. 241-248, 2012 (8 pages).

Genoese, F et al., "Occurrence of negative prices on the German spot market for electricity and their influence on balancing power markets," 2010 7th International Conference on the European Energy Market, IEEE, pp. 1-6, 2010 (6 pages).

Gil, A et al., "State of the art on high temperature thermal energy storage for power generation. Part 1—Concepts, materials and modellization.", Renewable and Sustainable Energy Reviews, vol. 14, Issue 1, pp. 31-55, 2010 (25 pages).

Gladstone, C et al., "On buoyancy-driven natural ventilation of a room with a heated floor.", Journal of Fluid Mechanics, vol. 441, pp. 293-314, 2001 (22 pages).

Glatzmaier, G, "Developing a cost model and methodology to estimate capital costs for thermal energy storage," National Renewable Energy Laboratory, Dec. 2011 (21 pages).

He, Q et al., "A Study on Latent Heat Storage Exchangers with the High Temperature Phase Change Material.", International Journal of Energy Research, pp. 331-341, 2001 (11 pages).

Henry, A et al., "The prospect of high temperature solid state energy conversion to reduce the cost of concentrated solar power," Energy & Environmental Science, vol. 7 pp. 1819-1828, 2014 (10 pages).

Herrmann, U et al., "Overview on Thermal Storage Systems," FLAGBEG Solar International GmbH, Workshop on Thermal Storage for Trough Power Systems, Feb. 20-21, 2002 (23 pages).

Herrmann, U et al., "Two-tank molten salt storage for parabolic trough solar power plants.", Energy, vol. 29, Issues 5-6, pp. 883-893, 2004 (7 pages).

Hibiya, T et al., "Thermophysical Properties of Molten Silicon," Crystal Growth Technology: From Fundamentals and Simulation to Large-Scale Production, pp. 103-136, 2008 (34 pages).

International Search Report and Written Opinion for PCT/US17/43474, dated Oct. 12, 2017 (11 pages).

(56) References Cited

OTHER PUBLICATIONS

Iverson, BD, et al., "Supercritical CO 2 Brayton Cycles for Solar-Thermal Energy," Applied Energy, vol. 111, pp. 957-970, Nov. 2013 (14 pages).
Janz, GJ et al., "Molten Salts: Volume 3 Nitrates, Nitrites, and Mixtures: Electrical Conductance, Density, Viscosity, and Surface Tension Data," Journal of Physical and Chemical Reference Data, vol. 1, pp. 581-746, 1972 (167 pages).
Kearney, D et al., "Overview on use of a Molten Salt HTF in a Trough Solar Field.", National Renewable Energy Laboratory, Parabolic Trough Thermal Energy Storage Workshop, Golden, CO, Feb. 20-21, 2003 (27 pages).
Kotzé, J et al., "A Combined Latent Thermal Energy Storage and Steam Generator Concept Using Metallic Phase Change Materials and Metallic Heat Transfer Fluids for Concentrated Solar Power," 2011 (8 pages).
Kotzé, J et al., "Evaluation of a latent heat thermal energy storage system using AlSi12 as a phase change material," 2012 (10 pages).
Kotzé, J et al., "Simulation and Testing of a Latent Heat Thermal Energy Source Unit with Metallic Phase Change Material.", Energy Procedia, vol. 49, pp. 860-869, Dec. 2014 (10 pages).
Kousksou, T et al., "Energy Storage: Applications and Challenges.", Solar Energy Materials and Solar Cells, vol. 120, Part A, pp. 59-80, Jan. 2014 (22 pages).
Medrano, M et al., "State of the art on high-temperature thermal energy storage for power generation. Part 2—Case Studies.", Renewable and Sustainable Energy Reviews, vol. 14, Issue 1, pp. 56-72, Jan. 2010 (17 pages).
Moens, L, et al., "Advanced Thermal Storage Fluids for Solar Parabolic Trough Systems.", Journal of Solar Energy Engineering, vol. 125, Issue 1, pp. 112-116, 2003 (5 pages).
Nicolosi, M, "Wind power integration and power system flexibility—An empirical analysis of extreme events in Germany under the new negative price regime," Energy Policy, vol. 38, pp. 7257-7268, Nov. 2010 (12 pages).
Paraschiv, F et al., "The impact of renewable energies on EEX day-ahead electricity prices," Energy Policy, vol. 73, pp. 196-210, Oct. 2014 (15 pages).
Pioro, I, et al., "Thermophysical Properties at Critical and Supercritical Conditions.", Heat Transfer—Theoretical Analysis, Experimental Investigations and Industrial Systems, pp. 573-592, 2011 (22 pages).
Sasaki, et al., "Temperature Dependence of the Electrical Resistivity of Molten Silicon," Japanese Journal of Applied Physics, vol. 34, Part 1, No. 7A, pp. 3426-3431, 1995 (7 pages).
Schwede, JW et al., "Photon-enhanced themionic emission for solar concentrator systems," Nature Materials, vol. 9, pp. 762-767, Aug. 1, 2010 (7 pages).
Towler, G et al., "Chemical Engineering Design 2nd Edition", 2012.
Wang, X et al., "Experimental research on a kind of novel high temperature phase change storage heater," Energy Conversion and Management, vol. 47, pp. 2211-2222, Sep. 2006 (12 pages).
Wang, Z et al., "Aluminum and silicon based phase change materials for high capacity thermal energy storage," Applied Thermal Engineering, vol. 89, pp. 204-208, Oct. 5, 2015 (5 pages).
Weinstein, LA, et al., "Concentrating Solar Power.", Chemical Reviews, vol. 115, pp. 12797-12838, Oct. 29, 2015 (42 pages).
Wilson, VC, "Conversion of heat to electricity by thermionic emission.", Journal of Applied Physics, vol. 30, p. 475-481, 1959 (8 pages).
Xu, G et al., "Techno-economic analysis and optimization of the heat recovery of utility boiler flue gas.", Applied Energy, vol. 112, pp. 907-917, Dec. 2013 (11 pages).
Yang, Z et al., "Electrochemical energy storage for green grid.", Chemical Reviews, vol. 111, pp. 3577-3613, Mar. 4, 2011 (37 pages).

\* cited by examiner

SYSTEM FOR DIRECT ELECTRICAL CHARGING AND STORAGE OF THERMAL ENERGY FOR POWER PLANTS

The present application is a national stage application of International Application No. PCT/US2017/043474, filed Jul. 24, 2017, which claims priority to and the benefit of U.S. Provisional Application Ser. No. 62/428,074, filed on Nov. 30, 2016, and titled, "METHOD AND DEVICE FOR DIRECT ELECTRICAL CHARGING AND STORAGE OF THERMAL ENERGY FOR SUPERCRITICAL STEAM POWER PLANTS," the contents of each which is incorporated herein by reference in their entireties.

BACKGROUND OF THE INVENTION

This invention relates to thermal energy storage and release and more particularly to a thermal energy storage system that utilizes electrically heated phase change material as the storage medium.

The ability to store energy during times of low demand, and utilize this stored energy during peak demand, is a critical necessity for existing power plants as well as future renewable energy driven power plants. Dispatchable electricity is an issue that most renewable energy power plants struggle with, given the intermittency of their sources, e.g. wind, solar, geothermal, etc. Pumped hydro and compressed air energy storage (CAES) have been the two main methods of energy storage for fossil fuel fired power plants, though the applicability of these methods is highly dependent upon geographic location. The cost of technologies such as batteries are still too high to be practical for large-scale applications; likewise for super magnetic energy storage, supercapacitors, flywheels etc. [1-4]. Thermal energy storage (TES) via latent heat, sensible heat, and/or thermochemical energy is an alternative for grid scale energy storage. In fact, sensible heat is the main form of energy storage for existing concentrated solar power plants and for those under current construction.

Thermochemical energy storage can achieve the highest of energy densities, however the complexities in the thermochemical processes require much more research and optimization for large-scale implementation to be attractive. Latent heat can have higher energy densities than sensible energy, thereby allowing for smaller system volumes and potentially lower cost. However, low cost and high efficiency latent storage systems have hitherto been underdeveloped due to complexities such as thermal stability, material compatibility, and low thermal conductivity of common phase change materials.

Fossil fuel power plants operating on the Rankine cycle have been increasing their efficiency since the 1950's with the introduction of superheated and supercritical steam [5]. Governing the efficiency ($\eta$) across all power plants, irrespective of energy source, is the Carnot efficiency for ideal heat engines, $$\eta = 1 - \frac{T_L}{T_H}$$

where $T_L$ is temperature of the cold reservoir, and $T_H$ is temperature of the hot reservoir, which conveys the simple relation of higher working fluid temperatures leading to higher efficiencies. Considering mechanical components of the power cycle, specifically turbines, have essentially reached the maximum efficiency attainable [6], other methods of increasing overall plant efficiency are sought after. Thus, the temperature of the fluid fed into steam turbines has been progressively increasing with the development of materials that can withstand such high temperatures without loss of structural integrity. Supercritical water power plants operate around pressures of ~250 bar and temperatures of ~540-560° C., resulting in a typical efficiency of ~45% at maximum operating temperature [7]. Ultra-supercritical water power plants operate at even higher temperatures and pressures, upwards of 580° C. and 250 bar, respectively. Given such thermodynamic conditions, ultra-supercritical plants have potential to reach efficiencies greater than 45%, yet have not been implemented to the extent that supercritical plants have due to the higher cost of materials that can withstand such temperatures [8]. Supercritical $CO_2$ Brayton cycles are also gaining attention due to the high temperatures such cycles can reach, over 600° C., and corresponding high efficiencies around 50% [9,10]. The thermodynamic cycle with the highest practical efficiency is that of an integrated gasification combined cycle (IGCC) using both gas turbine and steam turbine, able to achieve efficiencies around 60%[11].

The unavoidable variation in electricity demand over a 24 hour period creates strain and sources of inefficiency in power plants. During times of low demand such as at night, the boiler must be kept firing and hence the turbine must maintain minimum activity. Much of the electricity produced during these times is unfavorable for the economics of the plant due to the mismatch in cost required to produce the electricity and price at which the electricity is sold. During times of peak demand, the boiler and turbine must ramp up, causing strain on the machinery. Peaker plants are also often implemented to satisfy increasing demand in electricity during select hours of a day. Nuclear power plants are even less flexible in terms of adjusting to demand variations. Hence, the ability to store energy during periods of low demand and release the energy during periods of peak demand is an urgent issue in need of being realized at low cost and high efficiency.

Renewable energies, such as wind and solar thermal or solar photovoltaics, introduce further aggravation upon the grid due to the intrinsic intermittency of these sources. Oversupply of electricity generated during peak hours has led to negative pricing in some regions [12-15]. In other regions, there is a mismatch between hours in which renewable energies are most available and hours of peak electricity demand [16]. Economical energy storage methods that can address this problem are critical for future expansion of renewable energy.

Currently, TES is used in some concentrated solar power (CSP) plants. The TES is based on storing heat generated by sunlight into sensible heat stored in materials such as solar salt and Hitec XL[17,18]. In fact, these materials are used as both a heat transfer fluid and storage material: solar energy absorbed is transferred to these materials and subsequently stored in a tank or tanks. Solar salts (nitrate salts) have been widely used as the storage material/heat transfer fluid of solar parabolic trough power plants, and are among the salts having low costs. Low freezing temperatures are of particular importance for sensible storage materials since this is the temperature above which the fluid must always be maintained to avoid solidification, which would consequently cause permanent damage to the pipes used for fluid transportation. Furthermore, these sensible materials have a maximum operating temperature hence limiting the plant cycle efficiency. High temperature sensible energy storage mediums that are not economically devastating include silica fire bricks, magnesia fire bricks and carbonate salts. High temperature phase change materials that have a high thermal conductivity and are also economically attractive include, but are not limited to, the eutectic alloy $Al_{0.88}Si_{0.12}$ and elemental silicon [19].

Material properties of common sensible heat materials, and preferred sensible and latent heat materials are included in Table 1.

TABLE 1

Material Properties

| Material | Hitec XL [20] | Nitrate Salts [17] | Silica Fire Brick [17] | Magnesia Fire Brick [17] | Carbonate Salt [17] | $Al_{0.88}Si_{0.12}$ [21] | Silicon [22] |
|---|---|---|---|---|---|---|---|
| Density (kg m$^{-3}$) | 1992 at 300° C. | 1870 | 1820 | 3000 | 2100 | 2700 | 2560 |
| Thermal Conductivity $\lambda$ (W m$^{-1}$K$^{-1}$) | 0.519 at 300° C. | 0.52 | 1.5 | 1 | 2 | 160 | 62 at 1414° C. |
| Avg. Thermal Capacity $C_p$ (kJ kg$^{-1}$ K$^{-1}$) | 1.447 at 300° C. | 1.495 | 1 | 1.15 | 1.8 | 1.741 | 1 |
| Latent Heat of Fusion $h_L$ (kJ kg$^{-1}$) | — | — | — | — | — | 560 | 1920 |
| Melting/Freezing Temperature $T_m$ (° C.) | 120 | 220 | N/A | N/A | 400 | 576 | 1414 |
| Maximum Temperature $T_H$ (° C.) | 500 | 565 | 700 | 1200 | 850 | — | — |
| Minimum Temperature $T_C$ (° C.) | 200 | 300 | 200 | 200 | 450 | — | — |
| Cost (USD kg$^{-1}$) | 1.19 | 0.5 | 1 | 2 | 2.4 | 1.78 | 1.7 |

SUMMARY OF THE INVENTION

The system for storage and release of thermal energy according to the invention includes a unit for containing at least one electrically conducting phase change material along with electrical circuitry for driving electrical current through the phase change material or at least one electrical heater used to convert electricity into heat stored in the phase change material. Structure is provided for transferring heat in the phase change material to a working fluid for electricity generation through at least one turbine connected to one electrical generator or for transferring heat in the phase change material to any electricity generating subsystem. Heat is transferred from the thermal energy storage unit to the heat-to-electricity subsystem predominantly by radiation or conduction heat transfer.

In a preferred embodiment of the conduction dominant invention, the phase change material is an aluminum-silicon alloy. A suitable aluminum-silicon alloy is $Al_{0.88}Si_{0.12}$. Silicon itself may be the phase change material. In another preferred embodiment, the unit includes an annular tube providing a passage for heat transfer fluid in intimate contact with the phase change material. The structure for transferring heat to the working fluid may rely on heat conduction. In a preferred embodiment of the radiation dominant invention, the phase change material is molten silicon, operating near its phase change temperature. When the energy release method is based on radiative heat transfer, intimate contact of the heat transfer fluid tube and phase change material is not necessary. The system based on radiative heat transfer includes movable thermal insulators disposed in a space between the unit containing the phase change material and heat transfer pipes or electricity generating subsystem.

DESCRIPTION OF THE PREFERRED EMBODIMENT

Figure 1C:
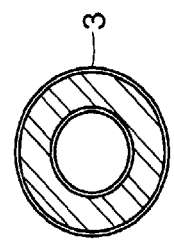
FIG. 1C is a cross-sectional view of the structure shown in FIG. 1B.

To describe the invention disclosed herein, the term "charge" shall be used to convey electrical heating of the thermal energy storage medium, and the term "discharge" shall be used to convey the release of said stored energy. This invention takes a different approach from existing TES systems. The key attributes of the new energy storage device are (1) it uses one or several high temperature high thermal conductivity phase change materials such as elemental silicon or the eutectic $Al_{0.88}Si_{0.12}$, (2) the phase change materials are charged by electricity rather than heat either directly by passing current through the material or indirectly through electrical heaters, (3) the phase change material remains stationary, i.e., not actively pumped, (4) stored thermal energy may be transferred to the working fluid predominantly through radiative heat transfer, (5) stored thermal energy is released to produce high temperature and high pressure water vapor which is subsequently used for electricity generation via either a steam turbine or released to a Stirling engine or other types of heat-to-electricity generation devices. The same approach can also be used for gas turbines, although subsequent discussion will use steam turbines as an example, with the Stirling engine and alternative heat-to-electricity generation approaches discussed lastly. This conversion of electrical energy to heat (mostly latent heat) and back to electrical energy approach is counterintuitive at first glance since one cannot convert all of the heat generated by electricity back into electricity, according to the second law of thermodynamics. However, cost analysis shows that it can be cost competitive and attractive for both fossil fuel power plants and renewable energy power plants. In fact, recent work has been published describing a system in which electricity is converted into heat for storage, including: the conversion of electricity from wind turbines into heat stored in rocks then back to electricity via steam turbines by Siemens[23]; possible conversion of electricity into heat stored in silicon then back to electricity via thermophotovoltaic cells by Datas et al. [24]; and possible conversion of electricity into heat stored in silicon then back to electricity via Brayton cycle by the Australian company 1414C [25]. However, the invention disclosed herein differentiates itself from that of Siemens by storing thermal energy within a phase change material in a configuration such that the round-trip efficiency surpasses that of the efficiency stated by Siemens. The present invention which shares similarities to that published by Datas differentiates itself by geometry of the silicon containing units and thermophotovoltaic system. Furthermore, the invention disclosed herein is founded on different heat transfer principles than what can be inferred of the work by 1414C, and may couple to various thermodynamic cycles and heat-to-electrical devices rather operating with the Brayton cycle. The approach of electrical to thermal back to electrical energy in the method disclosed herein has the following potential advantages:

Electrical heating has high efficiency and can reach high temperature. In theory, it can reach 100% efficiency and arbitrarily high temperatures.

Use of phase change materials enables a small footprint of the storage system.

By utilizing radiative heat transfer, high pressure working fluids such as supercritical fluids may be produced by the storage system without concern of safety upon possible fracture of the heat transfer fluid tubes due to wear and thermal cycling.

The system can be built into an existing conventional fossil power plant, nuclear power plant, or a CSP plant, so that they can share the same steam or gas turbines, hence reducing the capital cost.

The system can take electricity from the grid as well as from local generation, and smoothen out the electrical fluctuations from renewable energy supply.

The system can take electricity from local generation to increase efficiency, for example, boiler efficiency by maintaining appropriate temperatures within the boiler during periods of low demand.

The system can also be built next to a photovoltaic farm/power plant or wind turbine(s) as an energy storage device for intermittent renewable energy sources. In such cases, new steam turbine(s), or other forms of heat to electrical energy converters, must be installed if not already existing near the site.

It is also possible that the system can be installed on a smaller scale, such as for a community or individual building, commercial or residential. These small scale systems may be used for water heating or coupled to heat-to-electricity converters such as small steam turbines, thermophotovoltaic energy converters, thermoelectric energy converters, Stirling engines, electrochemical thermal energy converters, and other forms of heat-to-electrical energy converters.

There are several desirable attributes of the phase change materials considered, including large latent heat, high thermal conductivity, low cost, etc. For direct electrical heating, the material itself should be electrically conducting. Since the storage material is mostly stationary (it is possible for some natural convection to exist) heat stored in the materials is transferred to the working fluids mostly by heat conduction or radiation. Low thermal conductivity leads to an undesirably large temperature difference within the phase change material, reducing efficiency and discharge rate. Example phase change materials of high thermal conductivity are metallic alloys such as aluminum silicon alloy $Al_xSi_{1-x}$, $Fe_xSi_{2-x}$, or Si. The properties of $Al_{0.88}Si_{0.12}$, which is an eutectic, and the properties of Si are presented in Table 1.

Although such electrically and thermally conducting materials are more expensive on a per kilogram basis compared to typical molten salt materials based on sensible heat energy storage, the overall cost can be cheaper and require considerably less of a footprint. An overall system evaluation has been conducted based on sensible and latent heat materials, with respect to a 600 MW (mega-Watt) supercritical water power plant capable of 12 hours energy storage, i.e. 7200 $MWh_e$ (mega-Watt hour electric). The properties of supercritical water are evaluated at 575° C. at 250 bar for a maximum cycle efficiency without increasing cost of the heat transfer fluid tubes. Due to the maximum temperature limit of solar salt and HitecXL, they are excluded from the following analysis. Both solar salts and HitecXL may be incorporated into the design, however efficiency and required footprint of the system must also be considered alongside cost. A two-tank molten salt storage system has been evaluated based on carbonate salts. Molten sensible storage systems require salt pumps to allow the molten salt to be circulated between the hot tank and cold storage tank, and if pursuing indirect storage, an additional heat exchanger to transfer heat from the salt to a heat transfer fluid [26]. These two components add significant cost to the system, and are included in the analysis of carbonate salts. Sensible storage systems based on solid magnesia fire brick and silica fire brick have been evaluated.

As can be seen from the expression for radiative heat transfer, $$Q \propto (T_H^4 - T_C^4)$$

the hot side temperature $T_H$ should be much larger than the cold side temperature $T_C$ for sufficient radiative heat transfer between the two objects. Elemental silicon has a high melting point and large latent heat, thus lending itself as an ideal phase change material for the radiative based version of the invention disclosed herein, though also suitable for the conduction based version.

As stated, a thermal energy storage system has been designed on the basis of supporting a 600 $MW_e$ supercritical water power plant with 12 hours of energy storage. However, the following system may be scaled up or down, with respect to power and hours of storage. The fossil fuel-fired plant that the design is based on utilizes the combustion of pulverized coal within a boiler to produce supercritical steam at 250 bar and 575° C. as the conditions for the main steam. Typical supercritical water power plants (SCWPP) consist of a preheater, boiler furnace, primary superheater, secondary superheater, final superheater, turbine, condenser, economizer and electric generator.

The efficiency to electrically heat a phase change material can be close to 100%. All energy stored will either be transferred to the heat transfer fluid or, assuming negligible heat loss through the insulation, remain stored thereby reducing thermal energy input required for the next cycle. Taking into account that a boiler's flue gas exhaust is accountable for 3-8% of efficiency loss in coal-fired power plants, while the electrically heated storage material does not have exhaust, the efficiency of supercritical fluid generated with the invention disclosed herein will be 3-8% higher than the typical 45% system efficiency of supercritical coal-fired power plants [27,28]. By optimizing surface area to volume of the storage system, thermal losses of the system are negligible. Hence, the entire cycle efficiency of the energy storage and release device is conservatively estimated to be that of the power plant cycle efficiency without storage, and without thermal losses by exhaust gas, i.e. 48% efficiency for supercritical Rankine cycle adopting the lower bound of efficiency loss due to exhaust. The following calculations are based on 48% round-trip efficiency, i.e., from electricity to thermal energy stored in the phase change material and back to electricity, accounting for possible losses through remaining power plant components such as the turbine, pumps, condenser, etc. Based on a cost analysis with varying round-trip efficiencies, an efficiency even lower than 48% proves to remain economically attractive.

The cost of the system was calculated to include cost of raw storage material, material cost of tank(s), cost of tank linings such as alumina, cost of electrical heaters, cost of insulation, cost of electrical and instrumentation, cost of operation and maintenance, contingency and sales tax. Estimates were based on cost models for thermal energy storage systems wherein: electrical and instrumentation is 7% of tank cost; sales tax is 4% of purchased cost; contingency and operations and maintenance is 7% of purchased cost [29].

Figure 11:
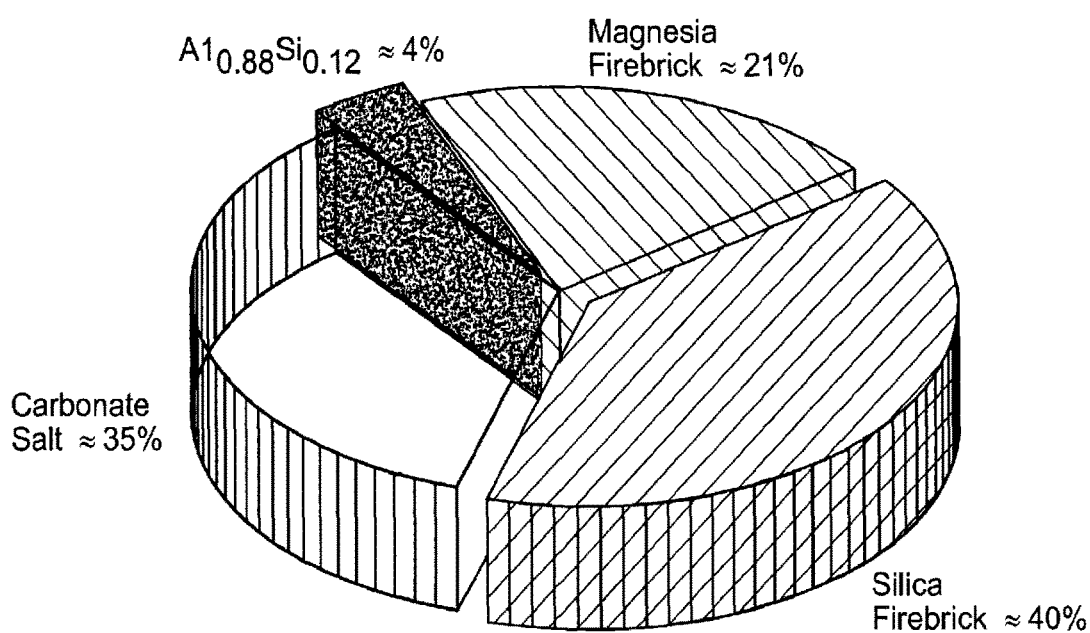
FIG. 11 is a pie chart comparing percent footprint required for the system with respect to storage material.

The height of the tank in which thermal storage material is contained can be designed according to site specific needs. The following cost and footprint evaluation considers tanks of 20 m height for the conduction based design of the invention. The temperature rise in sensible heat materials was based on the final heat transfer fluid temperature, and an upper bound temperature chosen to avoid additional cost imposed by high temperature steel tubes in contact with the thermal storage material. Molten salt systems require two tanks, one to store the salt when hot and one to store the salt when cooled, thereby necessitating additional cost for tank construction and doubling system footprint. As stated previously, energy storage systems utilizing a two-tank molten salt design must also invest in a salt-pump and, for indirect storage system, salt-to-oil heat exchanger. Since phase change materials and solid sensible materials remain stationary in a container, a pump is not required to transfer the energy storage material, hence the higher cost of said invention relying on carbonate salts. Although the material cost of silica fire brick is much less than that of $Al_{0.88}Si_{0.12}$, costs such as that of tank material drive the system to a larger expense. Due to the lower energy density of sensible heat materials, the overall system cost exceeds that of a latent heat based system, as shown in FIG. 11. The phase change material (PCM) system of the invention has been purposefully designed such that heat transfer is sufficient and therefore the system does not require an additional heat exchanger or secondary heat transfer fluid, as in the literature, to produce power [30,31].

Though cost is indeed an important factor in determining the feasibility of a design, footprint and energy efficiency is also critical. In order to easily install an energy storage system into an existing power plant, the footprint of the system must be minimized to the greatest extent. Existing fossil fuel-fired power plants were designed to be as spatially efficient as possible, leaving little room for any additional components to be added internally. If the subsystem is to be built beside the plant, presuming there is open land to do so, the cost of land purchase will play a prohibitive role in the adoption of the subsystem. Thus, the compactness that PCM-based storage systems offer is highly valuable. As can be seen from FIG. 12, the storage system based upon $Al_{0.88}Si_{0.12}$ has a footprint that is at most 4% than that of a sensible heat-based storage system, saving a considerable amount of land. The potential to retrofit a PCM-based system into existing power plants is highly attractive. Though the following design may be used with sensible storage materials, the use of high thermal conductivity PCM's is more attractive with respect to energy and entropic efficiency, due to the constant temperature at which heat is discharged compared to that of sensible storage materials.

Figure 1B:
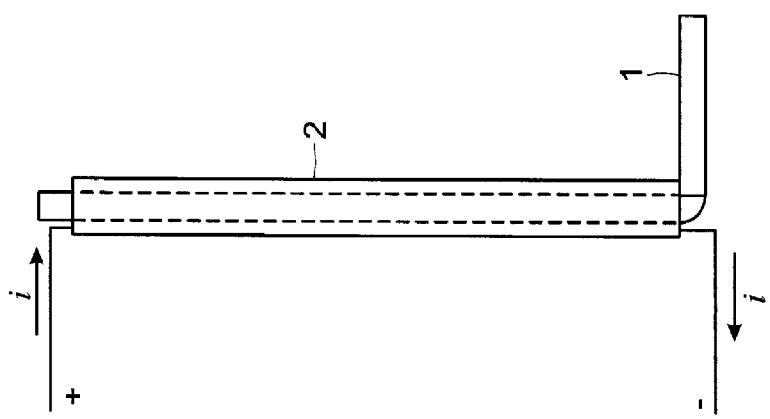
FIG. 1B is a cross-sectional view of a portion of FIG. 1A.
Figure 1A:
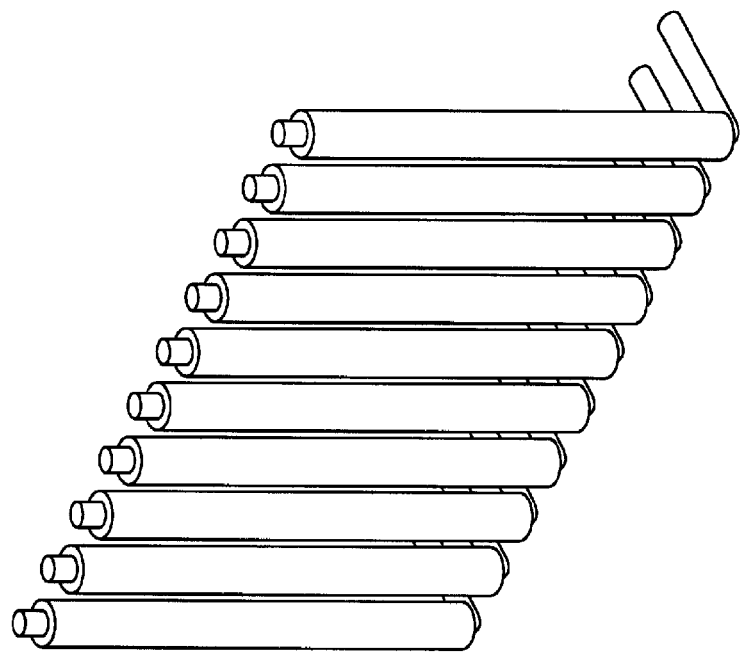
FIG. 1A is a perspective view of an embodiment of the invention utilizing conduction heat transfer disclosed herein.

FIGS. 1A, 1B and 1C present a design version of an embodiment of the conduction based system disclosed herein. FIG. 1A presents the device as individual tubular components, capable of being placed wherever spatially allowed. FIG. 1B presents the inlets of heat transfer fluid into the heat transfer fluid containing tube 1 and outer PCM shell 2. FIG. 1C presents the annular design of the device, wherein the PCM is encased 3 to surround the heat transfer fluid tube in the center. Heat transfer fluid (HTF) such as water flows up the center tube, collecting latent heat transferred by the PCM to produce, for example, supercritical fluid. Electrical leads are displayed in FIG. 1B to convey electrical charging of the PCM. Electrical heaters may be immersed in the PCM or induction heating may be used.

Figure 2A:
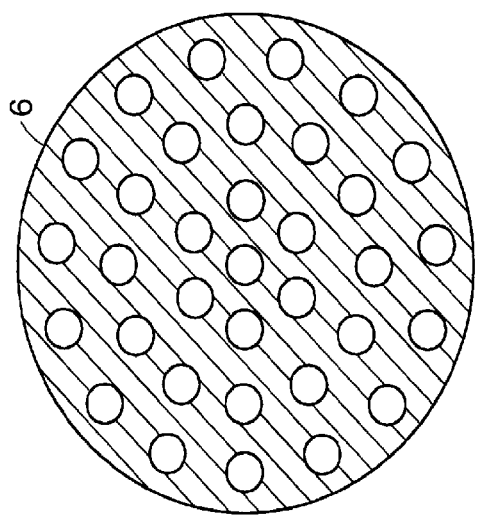
FIG. 2A is a perspective view of another embodiment of the invention disclosed herein.
Figure 2B:
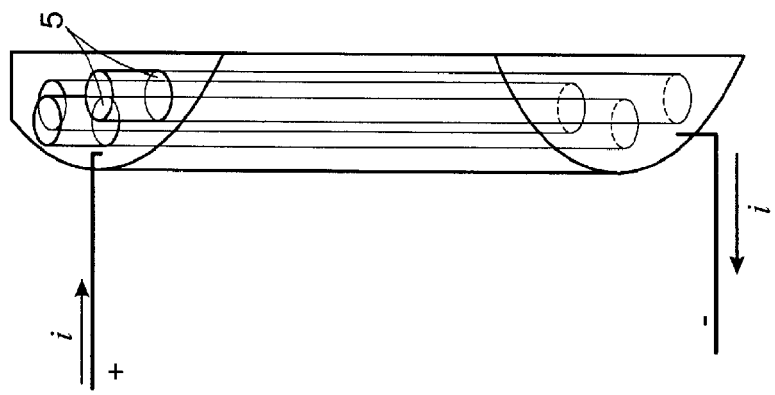
FIG. 2B is a cutaway view of FIG. 2A.
Figure 2C:
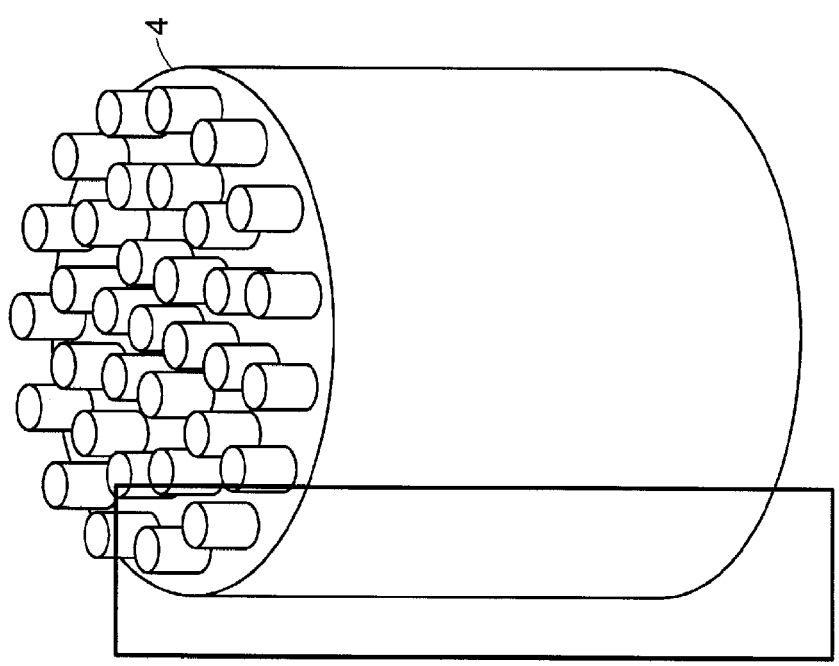
FIG. 2C is a cross-sectional view of the structure shown in FIG. 2A.

FIGS. 2A, 2B and 2C present a design version of the device. FIG. 2A presents the overall design with all, or a large portion, of tubes contained within the same PCM vessel 4. FIG. 2B. provides a detailed section of FIG. 2A wherein the inner design components are presented. The PCM surrounds the tubes 5 in which HTF flows up to collect latent heat from the PCM during phase change. Electrical leads may connect to the top surface of the PCM-based heater container, as shown, passing current through the bottom of the container holding all (or some) of the PCM and HTF tubes. FIG. 2C conveys the region containing the stationary PCM 6, surrounding the HTF tubes. Electrical heaters may also be immersed within the PCM in alternating fashion with the tubes.

Figure 3C:
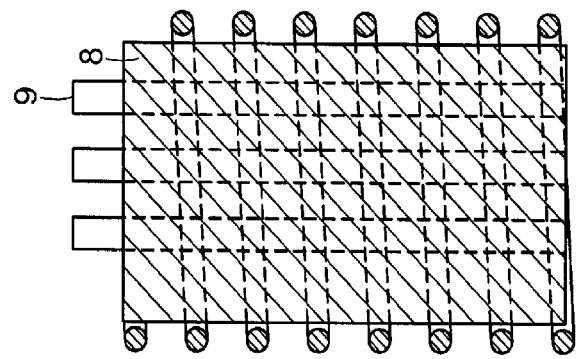
FIG. 3C is a sectional view of the structure in FIG. 3B.
Figure 3B:
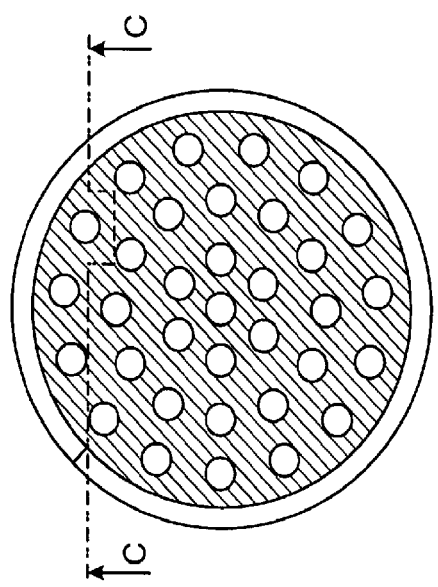
FIG. 3B is a cross-sectional view of the structure of FIG. 3A.
Figure 3A:
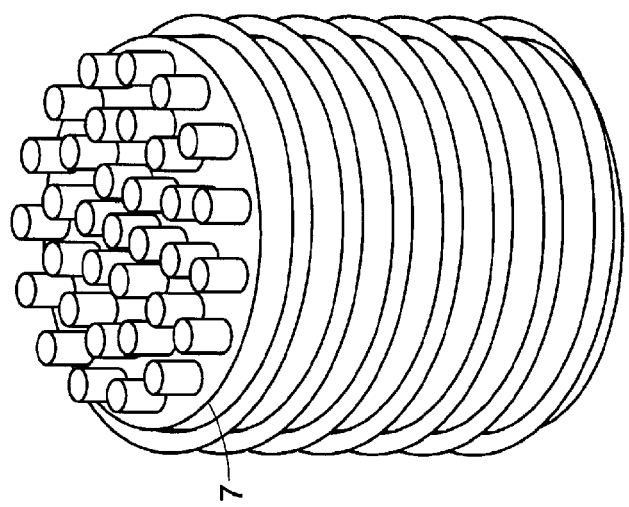
FIG. 3A is a perspective view of another embodiment of the invention using induction heating.

FIGS. 3 (A-C) presents a design version similar to that of FIG. 2A but utilizes inductance heating to convert electricity into heat stored within the PCM. The PCM is within a single container 7 with inductance coils wrapping around the container in helical form. FIG. 3B displays the PCM 8 filling the container, as shown in FIG. 3C. The HTF tubes 9 are placed within the container, surrounded by the PCM 8.

Figure 4B:
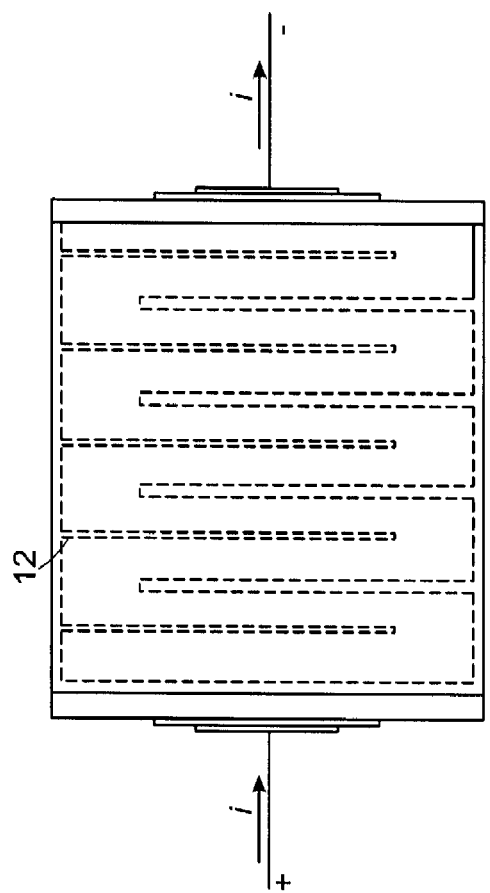
FIG. 4B is a cross-sectional view of the structure shown in FIG. 4A.
Figure 4A:
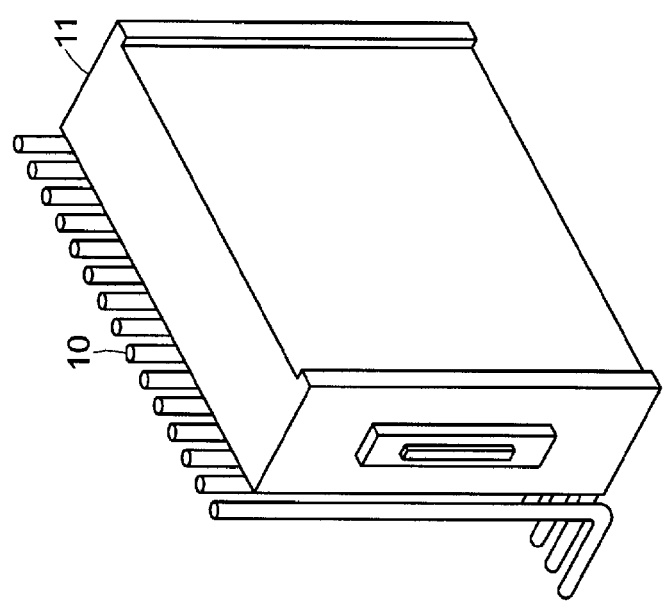
FIG. 4A is a perspective view of yet another embodiment of the invention.

FIGS. 4A and 4B present a design version of the device. FIG. 4A presents the overall design of tubes to PCM container. The tubes 10 are welded to the PCM container 11 and may have fins to enhance the heat transfer of latent heat from the PCM to the working fluid flowing up the tubes. FIG. 4B presents the inner design of the PCM container to enhance resistive heating. Insulating fins 12 are placed throughout the PCM to create a longer path for current to travel during system charging.

Figure 5B:
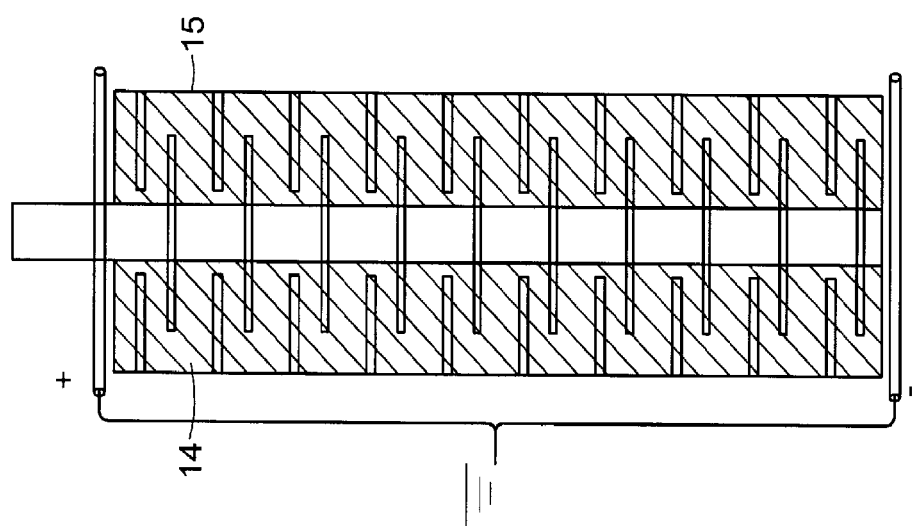
FIG. 5B is a sectional view of the structure shown in FIG. 5A.
Figure 5A:
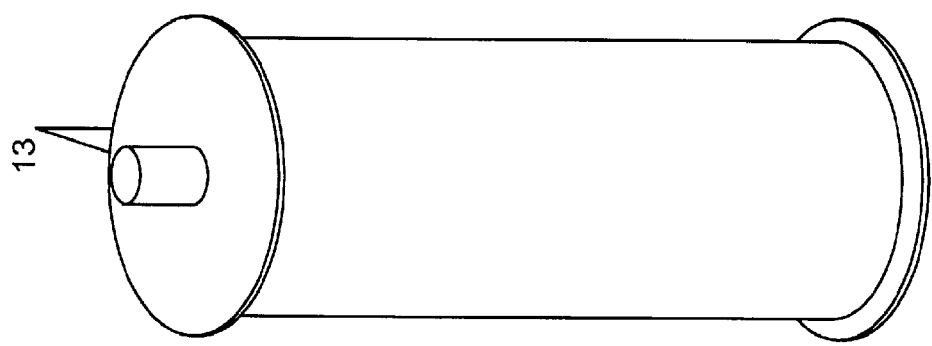
FIG. 5A is a perspective view of another embodiment of the invention disclosed herein.

FIGS. 5A and 5B present a design version of the device. FIG. 5A presents the overall design view from the outside, having a single component 13 to contain the PCM and flowing heat transfer fluid through a single tube. Multiple units of 13 may be placed, with total number depending on required power output. Electrode plates are placed on the top and bottom of the container 13 to allow current to travel through during charging. FIG. 5B presents the details of the PCM 14 and water tube down the center, with components to enhance resistive heating 15 such as insulating fins.

Figure 6C:
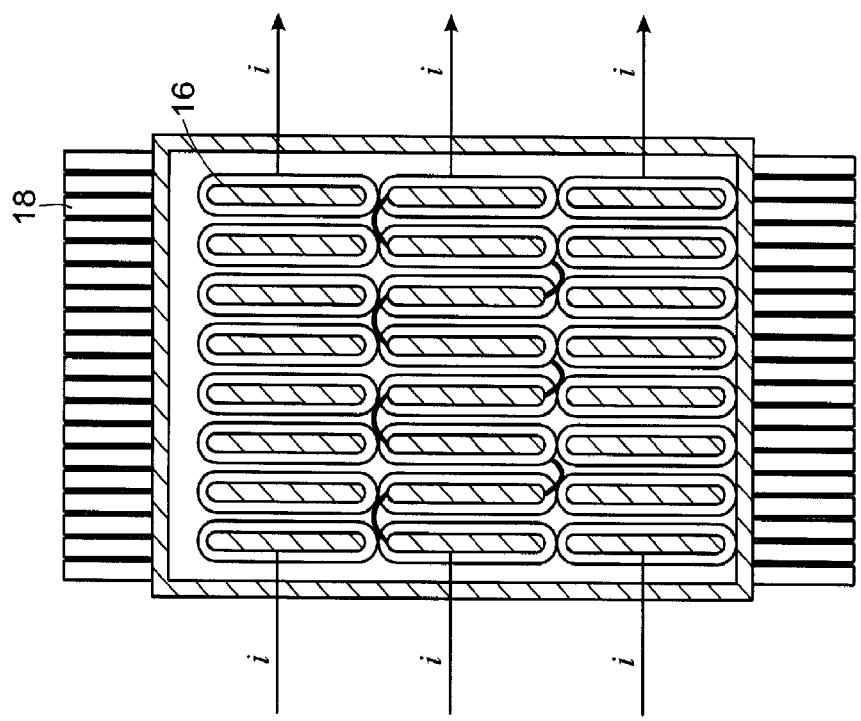
FIG. 6C is another sectional view of the structure of FIG. 6A.
Figure 6B:
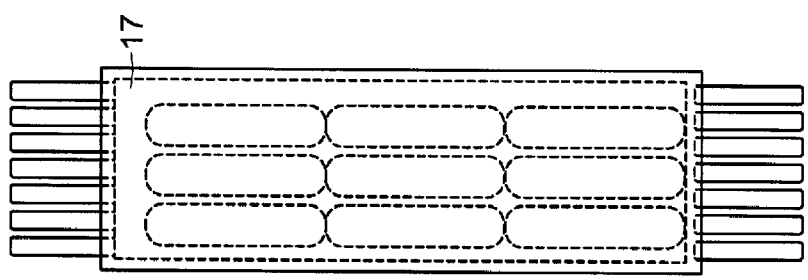
FIG. 6B is a sectional view of the structure of FIG. 6A.
Figure 6A:
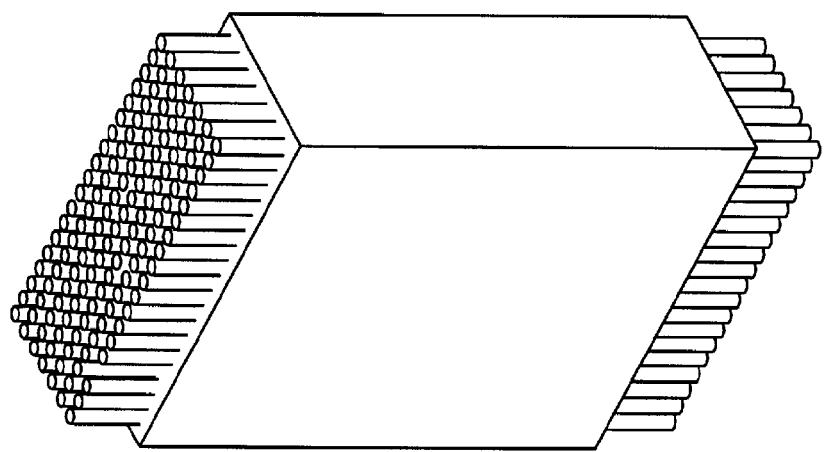
FIG. 6A is a perspective view of another preferred embodiment of invention.

FIGS. 6A, 6B and 6C present a design version of the device. FIG. 6A presents the overall design of the tubes to PCM container. FIG. 6B presents the layers of encapsulated PCM, with water/heat transfer fluid 17 flowing around them. FIG. 6C presents the encapsulated PCM 16 with electrical current paths to allow for electrical heating, using the PCM as the resistor. The HTF enters through the bottom and exits through the top tubes 18. Resistance heaters may also be immersed within the encapsulated PCM.

Figure 7:
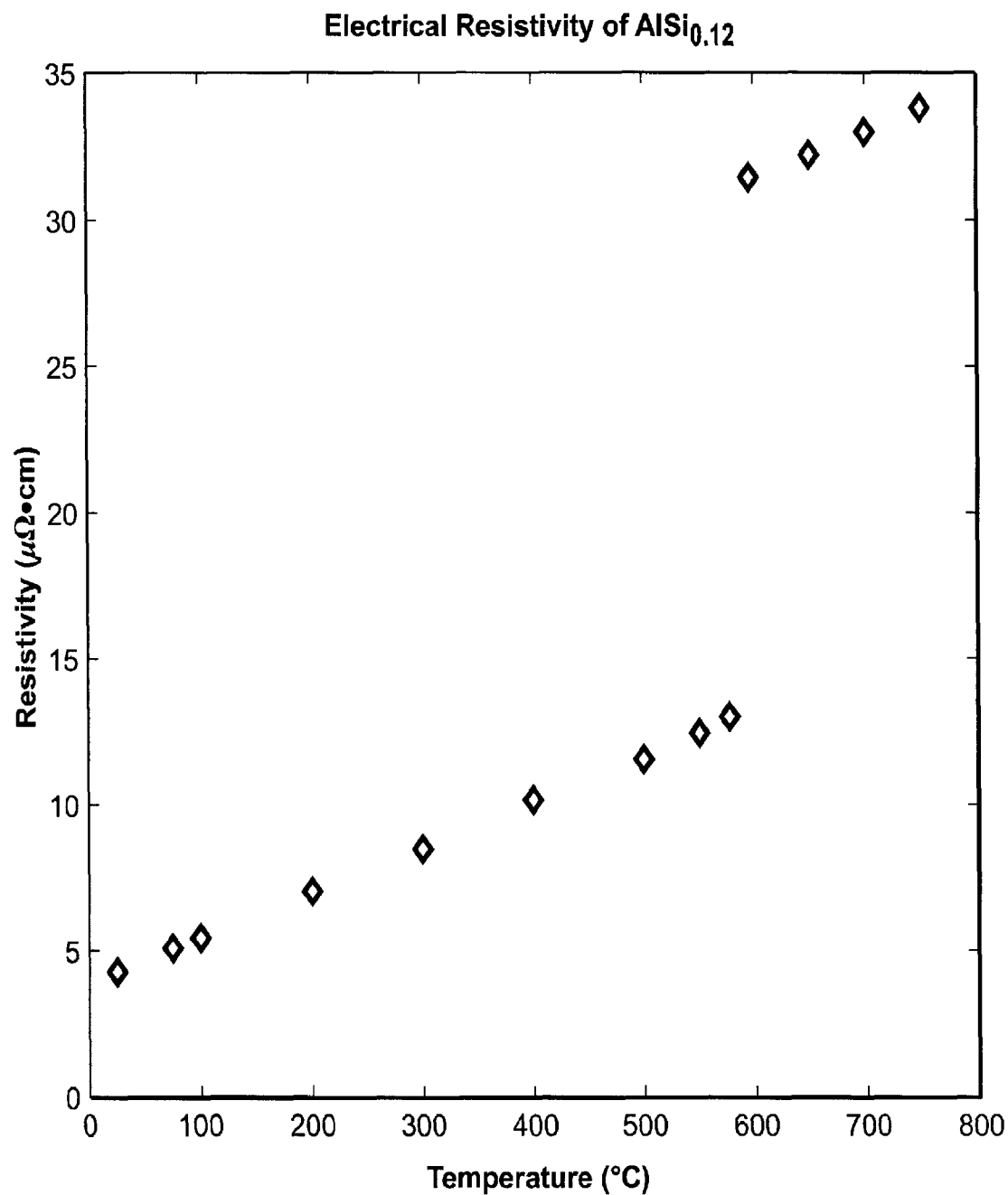
FIG. 7 is a graph of resistivity versus temperature for a phase change material.

FIG. 7 provides data for electrical resistivity of $Al_{0.88}Si_{0.12}$ with respect to temperature [32].

Figure 8:
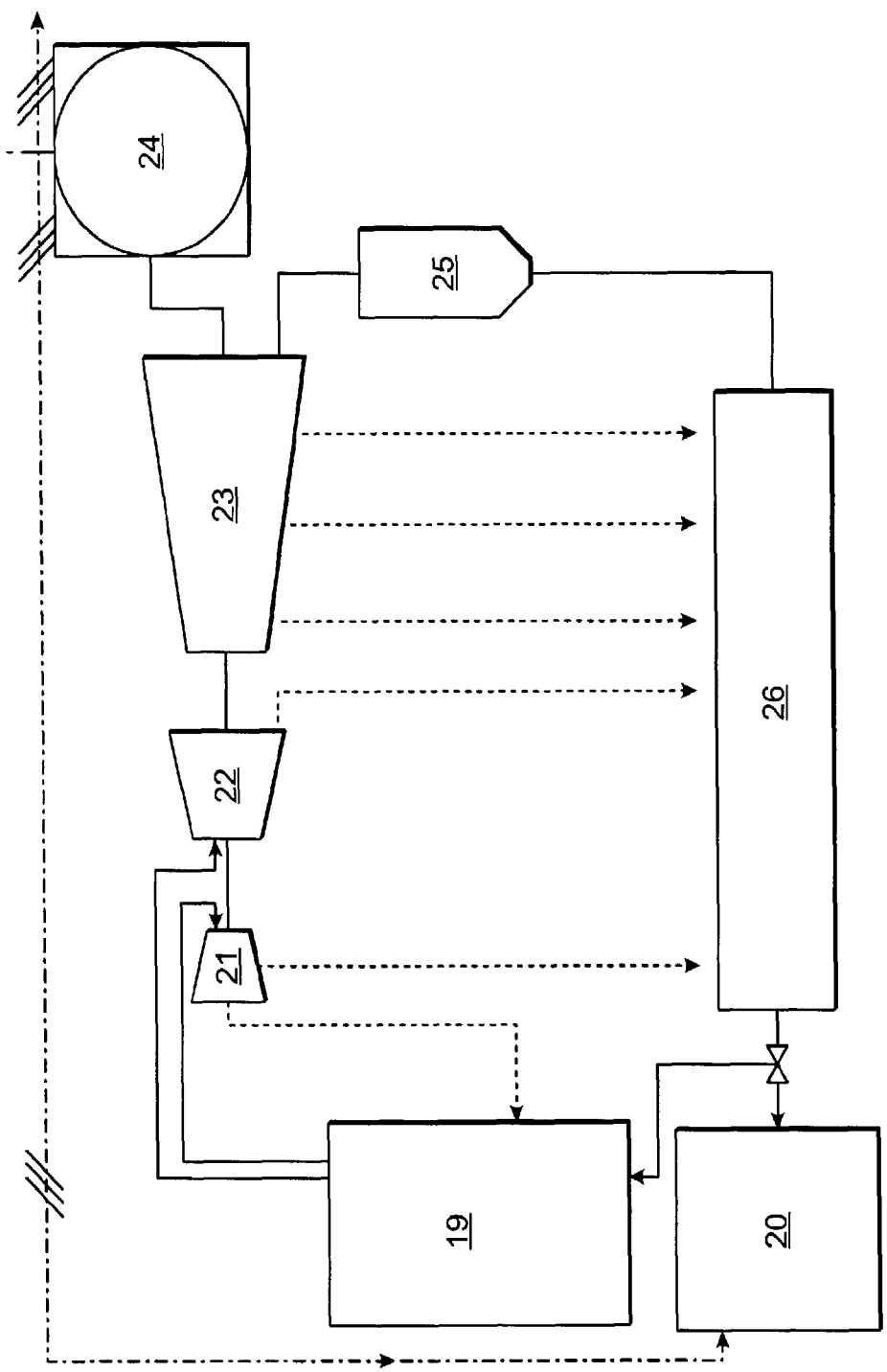
FIG. 8 is a schematic illustration of an embodiment of the invention in a power plant disclosed herein.

FIG. 8 depicts the device used with an existing or new supercritical water power plant in which the invention disclosed herein is charged directly through electricity generated by the plant or by electricity taken from the grid, and discharged to produce electricity during times of peak demand or times in which the original system is undergoing maintenance requiring shut down of the boiler. Depicted is the original boiler 19 heating the HTF, which is then sent to the high pressure turbine 21, intermediate pressure turbine 22, then low pressure turbine 23. The mechanical energy from the turbine is converted to electrical via generator 24, which is connected to the electrical grid. Steam from the turbines is sent to the regenerative system 26 to increase system efficiency. Steam exiting the low pressure turbine is condensed 25 and sent through the regenerative system, which includes an economizer, then back to the boiler. The thermal energy storage and release unit 20 satisfies the load placed on the boiler, allowing a reduced size of boiler system or for existing plants, reduced fuel consumption and replaces any need to build additional boiler units with increasing electrical demand. Water may flow through either the boiler or the PCM-based heater (or both) to reach supercritical temperatures then rejoin at the turbines. The thermal energy storage and release unit utilizes all other existing components 21-26 for electricity generation.

Figure 9:
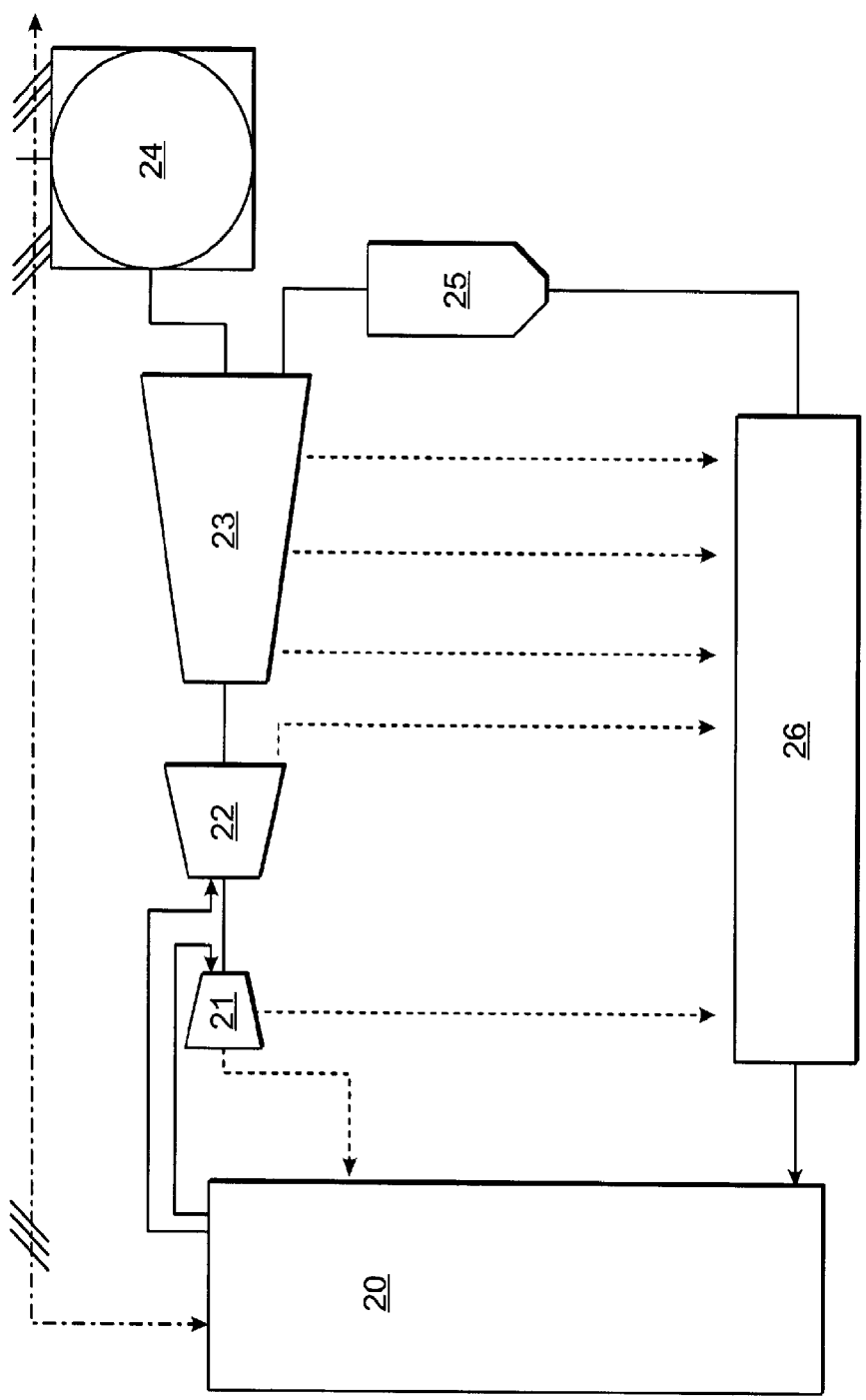
FIG. 9 is a schematic illustration of another embodiment of the invention in a power plant disclosed herein.

FIG. 9 depicts the device used with an existing or new supercritical water power plant or Brayton cycle based power plant or photovoltaic power plant or wind turbine farm, in which the device completely replaces the original superheating system or allows for storage of electricity generated by photovoltaic cells. Similar to the depiction in FIG. 8, the invention may also work alongside the original heating system for a Brayton cycle power plant. The PCM subsystem 20 is used to generate high temperature or supercritical fluid without use of other fuels or heat sources. All components following 19, 21-26 are the same as that of FIG. 8.

Figure 10:
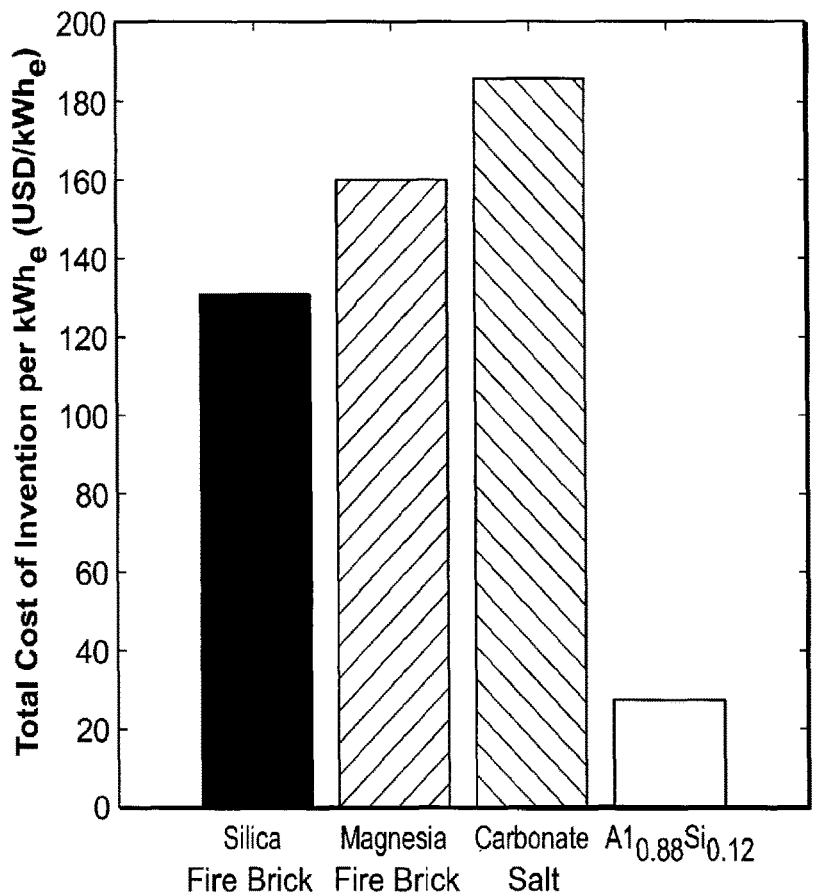
FIG. 10 is a bar chart comparing total cost of the conduction based invention with respect to storage material.

FIG. 10 depicts the total cost of the conduction based invention for various thermal energy storage materials, in units of USD per $kWh_e$ (kilo-watt hour electric). System efficiency is taken as 48% in cost calculations. Use of phase change material rather sensible materials clearly has advantage in cost due to high energy densities.

FIG. 11 provides a comparison of required footprint of the conduction based invention when containing different energy storage materials suitable. As it is most desirable for the invention to be retrofitted in existing power plants, a minimized system footprint is necessary.

To allow for minimal changes to the existing power plant, a PCM based design has been developed that can be retrofitted into existing power plants and utilize direct electrical heating to charge the system. FIGS. 2A, 2B and 2C display a basic design of the device, on which example calculations are based. Here, the HTF is water to run a steam turbine. Water flows up the center tubing and is heated through radial conduction originating from the PCM, and convection within the tubes by pumped water. The PCM is contained around the HTF tube, in a concentric manner. The water tube is of the same diameter as conventional water tubes in a boiler furnace.

The design of FIG. 1A allows for ease of accessibility and maintenance. In precaution of the tubes within the thermal energy storage and release system needing maintenance, the design allows for the individual tube to be worked on. Upon cooling the PCM to its solid phase, the PCM may be cut to access the water tube, using abrasive tool materials such as tungsten carbide. Ease of maintenance is a crucial aspect for power plants that cannot afford to halt production of electricity for long periods of duration until the issue is resolved. Such issues are problematic for most power plants regardless of whether it be fossil fuel or renewable energy driven. Assuming multiple units of the design shown in FIG. 2, such a configuration also allows for ease of accessibility and maintenance, though to a lesser extent than that of FIG. 1. Clearly, there is a tradeoff between cost of container material and ease of accessibility.

Possible materials for containers of phase change materials can be castable ceramics, metals, or even concretes. Electrical currents can directly pass through the phase change materials. In this case, an electrical insulation, such as aluminum nitride, between the phase change material and the inner tube may be needed. The tubes can be electrically connected in series or parallel, or a combination.

There are other implementations for the electrical heating and steam tube arrangements. Some are illustrated in FIGS. 3-6, and described above. In order to reduce the cost of the container and maintain material stability of the container, pressure must be kept to moderate levels. To incorporate thermal energy storage materials with vapor pressures that may be problematic, pressure release valves must be implemented on the housing container. All tubes may be housed in one container, having a pressure release valve per container.

Due to the design of supercritical plants, it would not behoove the overall efficiency and fuel consumption to replace any individual component of the boiler system such as the superheater or reheater. Supercritical boilers have been designed to utilize the existing flue gas produced from combustion to further heat the fluid downstream of the furnace, thereby increasing overall efficiency of the boiler system. Thus, downstream components must remain if the existing boiler furnace is to be used, and the invention disclosed herein may be a separate heating source for the heat transfer fluid, reducing coal or oil consumed by the plant. A scenario allowing complete reliance on the thermal energy storage and release system to generate electricity, without a fossil-fuel energy source used in conjunction, is that of a photovoltaic-based plant to be discussed. The location and purpose of the invention disclosed herein has been evaluated for various schemes.

By producing base load power demand, the thermal energy storage and release system can reduce $CO_2$ emissions and thus costs imposed on the power plant through emission fines. As depicted in FIG. 8, the boiler 19 may operate at partial load to maintain temperatures within the boiler, and the invention disclosed herein may produce the remaining load. The amount of energy released from the system can be controlled by the mass flow rate of the fluid pumped through the system tubes. The two sources of supercritical fluid may then rejoin prior to the high pressure turbine. The electricity consumed by the system 20 may be derived from renewable resources, or generated locally. By operating the boiler 19 at nearly constant load and charging the system during times of low demand, the boiler efficiency may be optimized. Such a scheme is depicted in FIG. 8. Water flows through the system 20, and a separate line of water flows through the boiler 19, reaching supercritical temperatures within each heating system and rejoining at the high pressure turbine 21. Supercritical water will flow through the high pressure turbine, followed by intermediate pressure turbine 22, then low pressure turbine 23. The turbines will be used to generate electricity 24. Steam exiting the turbines prior to the condenser 25 will be sent to the regenerative system 26 for increased plant efficiency.

The same concept may be applied to implementing the invention in supercritical CO2 power plants operating on a Brayton cycle. Furthermore, as nuclear power plants struggle to quickly respond to changes in electricity demand, the invention may operate with a nuclear power plant to pacify such energy demands. Operation of the invention in a nuclear power plant may follow the same description as provided above for FIG. 8.

In all embodiments, the invention may be placed beside a fossil fuel-fired power plant, or a concentrated solar power plant, or a photovoltaic plant. The electricity consumed for charging the system can be derived directly from the local plant or derived externally, from an electrical grid. Electricity generated by a photovoltaic (PV) farm may be stored within the PCM-based heater to be used during times the PV can no longer generate electricity, i.e. times of low accessible solar radiation. In such a case, the thermal energy storage and release system may replace an entire oil- or coal-based heating system, or can be implemented in a new power plant as depicted in FIG. 9, thereby negating any use of fossil fuels or other sources of heat. The thermal energy storage and release system may operate the full 24 hours, and may be directly charged electrically during times of low demand.

In all embodiments, the water may be pumped through the tubes (1, 5, 9), heated to supercritical temperatures by the surrounding PCM (2-3, 4, 6, 8), as described in FIG. 1B, FIG. 2B, FIG. 3C, FIG. 4A, and FIG. 5B. In FIG. 6C a device design implements encapsulated PCM in a container, in which the HTF is pumped into the container and allowed to flow around the capsules, exiting through the top tubes.

In all embodiments, the device may be designed to that of annular components, or rectangular components. Such design should be based upon minimizing space in which the system is implemented, maintaining structural integrity of the thermal storage container, and ensuring sufficient heat transfer between the energy storage medium and working fluid or heat-to-electricity device.

In all embodiments, thermal insulation may be placed around the container to reduce thermal losses, thereby increasing overall efficiency.

In some embodiments, the thermal energy storage material may be $Al_{0.88}Si_{0.12}$ or other high thermal conductivity, high temperature phase change materials, such as Si, $Al_{0.72}Si_{0.28}$, $Al_{0.45}Fe_{0.15}Si_{0.40}$, $Al_{0.17}Si_{0.53}Ni_{0.30}$, etc.

In all embodiments, the invention can rather be based on a sensible energy material such as Hitec XL, solar salt, carbonate salts, silica fire brick, or magnesia fire brick, though the cycle operating temperature should be taken into account according to the material properties.

In some embodiments, the HTF may enter and exit at temperatures below supercritical, dependent upon application purpose. In some embodiments, the HTF may enter preheated and exit at supercritical temperatures. All embodiments are capable of considering the PCM $Al_{0.88}Si_{0.12}$ at temperatures up to 1414° C.; heating a working fluid up to 575° C. serves as an example and is not intended to be the limiting temperature. All embodiments are capable of withstanding atmospheric to beyond 250 bar of pressure within the HTF tubing or section designated for containing the heat transfer fluid. However, safety is always a concern in having high pressure fluid containing tubes in contact with a molten phase change material. Therefore, the conduction based design is safest in operation alongside a concentrated solar plant or other thermodynamic cycles that do not operate at supercritical pressures, or with heat-to-electricity devices based on conduction rather radiation heat transfer.

The method in which each energy storage unit is charged is novel and infrequently implemented, with little literature suggesting the idea [21,23-25,33]. Rather charging the system via heat transfer fluid, as is typically considered, the storage medium will be charged electrically. This allows direct energy transfer from the power plant or electricity grid to the storage medium without an intermediate thermal process. During times at which there is an excess of electricity production, typically at night time, the electricity can be sent to the thermal energy storage and release system rather being dumped or sold at reduced cost. Furthermore, if operating the invention in a thermal power plant, charging the system by means of combustion and operation of the power plant will reduce strains on the turbines that normally must ramp up and down to follow demand. Such operation of the invention will also reduce thermal stresses in the boiler due to temperature fluctuations following demand.

In some embodiments, the device is charged electrically through resistive heating, as displayed in FIGS. 4A & 4B, FIGS. 5A & 5B, and FIGS. 6A, 6B & 6C. By utilizing the electrical resistance of the thermal storage medium such as $Al_{0.88}Si_{0.12}$, a resistive circuit can charge the system thermally via joule heating, with 100% energy efficiency. The temperature of the thermal storage medium can be charged to an arbitrary maximum since it depends solely on the amount of power consumed. The device does not depend upon electrical wiring to produce the resistive heating; the thermal storage medium itself is the electrical heating component. All designs of the device presented in herein may be charged electrically via resistive heating through the medium itself, or charged with the addition of electrical heaters.

In some embodiments, electric current is forced directly through the thermal energy storage medium by a positive electrode and negative electrode in contact with the medium, as displayed in FIGS. 4A and 4B. A differential voltage applied across the medium, supplied by the power plant housing the device, forces electric current to travel through the medium thereby heating the energy storage medium to the desired final temperature. Thus, the medium is directly charged electrically, without the use of wires to produce the heat as claimed by other thermal storage designs [34]. All embodiments of the device may incorporate electrode plates.

In some embodiments of the device based on FIG. 1, the material resistivity of the outer tube containing the thermal storage medium and HTF tubes, such as 15CrMo or alumina, may be electrically charged and used as the resistive heater to charge the medium.

In some embodiments of the device, electrically insulating fins may be placed to protrude into the thermal energy storage medium, as displayed in FIG. 4B and FIG. 5B. Such fins serve the purpose to increase the path of electrical current along the medium during the charging process, thereby increasing resistance (R) according to the equation $R=\rho l/A$ where $\rho$ is the thermal energy storage medium resistivity, l is the path length through the medium that the current must travel, and A is the cross sectional area of the medium.

In some embodiments of the device, direct induction heating may be used to heat the thermal energy storage medium such as $Al_{0.88}Si_{0.12}$ rather than direct joule heating [35]. Such a design is displayed in FIGS. 3A, 3B and 3C. The outer tube material may be 15CrMo alloy steel, a highly magnetic composition of alloyed steel. Hence the outer tube will be highly efficient for induction heating, regardless of the heating directly induced in $Al_{0.88}Si_{0.12}$ by the magnetic field. All embodiments of the device may be designed to incorporate induction heating.

Design calculations for the conduction based invention disclosed herein have been performed for the design of FIG. 2, in which the heat transfer tubes are immersed in a large tank of thermal storage material. Containers may be placed in rows, or stacked for additional capacity, however suits the available space in the site of implementation. An overall plant efficiency of 48% is assumed for electric to thermal to electric conversion based on components in a supercritical water power plant. A design capacity of 600 MW with 12 hours of storage is assumed. Initial water inlet temperature is 100° C. and outlet temperature is designed to be 575° C. at 250 bar. Optimizing the design according to temperature gradients between the heat transfer fluid and across the storage material determines the size and number of tubes in the system. Pipe material is taken to be 15CrMo capable of high temperatures and commonly used for the water wall of supercritical boilers. The thermal storage medium may be electrically charged during times that supercritical water is produced by other means, such as combustion, with precaution taken to ensure the inside of the water tubes are dry before charging if implementing direct electrical heating wherein the medium presents the electrical resistance. Otherwise, coatings resistant to molten metals such as aluminum nitride may be applied between the tube and PCM as an electrically insulating, thermally conductive protective layer. A temperature gradient of 100° C. from the edge of outer planes of symmetry in the thermal medium+tube to the center of the water tube is used for heat transfer analysis. The water tube diameter is that of typical supercritical boiler tubes, 0.038 m with a tube thickness of 0.008 m. Calculations conclude in a system with a cost of ~12.9 USD $kWh_{th}^{-1}$ (kilo-Watt hour thermal) and ~27 USD $kWh_e^{-1}$ for the conduction based design of the invention using $Al_{0.88}Si_{0.12}$ as the thermal energy storage medium and conservatively assuming a power plant efficiency of 48%.

EXAMPLES

Example 1

Design Calculations

The design volume of a PCM depends upon the hours of storage, and the desired power rating. The system is capable of replacing the entire supercritical heating system including the pre-heater, boiler, superheaters, and re-heater. It can also be designed to only replace specific components, though optimization of the overall system is required. The amount of total thermal energy stored in the PCM system follows $$Q_{th}=(Q \cdot t)/\eta \qquad (1)$$

In Eq. (1), $Q_{th}$ is the amount of stored thermal energy in kilojoules (kj), Q is the required power rating of the system upon release of thermal energy in kilowatts electric ($kW_e$), t is the storage time in seconds, and η is the electric-to-thermal efficiency of 0.48 for this example, but depends on the system efficiency of the accompanying power plant. The volume of storage material necessary is calculated by Eq. (2)

$$V = \frac{Q_{th}}{\rho[h_L + c_p(T_h - T_m)]} \quad (2)$$

where ρ is the density of the PCM, $h_L$, is the latent heat of fusion of the PCM, $c_p$ is the specific heat of the PCM, $T_h$ is the temperature that the PCM is charged to, and $T_m$ is the phase change temperature of the PCM. Here, it is assumed that the final temperature of the PCM after discharge is near the phase change temperature.

To describe the system, a unit consists of a single tube in which heat transfer fluid flows, an outer tube between which PCM is contained, and any additional materials necessary for the chosen form of electrical charging. To determine the optimal outer diameter of each unit based on the configuration displayed in FIG. 2, iterative calculations were performed that take into consideration the number of units necessary to contain the total required volume, the thermal resistance across the unit, and the mass flow rate per tube. In order for heat transfer to occur, there must be a temperature gradient, and the heat flux through the PCM will be proportional to said temperature difference. The thermal resistance across each unit will determine the temperature difference from the tube in contact with the working fluid and the outer tube in contact with the PCM. Although electrical heating can reach high temperature in theory, the practical limit is set by the chemical stability of the material. Too large of a temperature gradient inside the PCM limits the maximum steam temperature to be reached. A temperature gradient of 100° C. has been chosen as an example, although not intended to be limiting, to determine the other varying design parameters. Therefore, 100° C. of sensible energy must be stored in the PCM to allow a temperature difference on average between the HTF and PCM. Each unit is designed to have a height of 20 m (L), however this length can easily be varied with other dimensions adjusted to account for this change if holding required volume fixed. The diameter of the water tube ($D_t$) is 0.038 m in accordance with typical water wall tube diameters in supercritical boilers. The inner diameter of the concentric PCM tube ($D_i$) is determined by the water tube diameter plus typical tube thickness of 0.004 m. The outer diameter of the unit and the number of tubes (N) necessary can be determined by Eq.3 through optimization.

$$V = \frac{\pi}{4} \cdot (D_o^2 - D_i^2) \cdot L \cdot N \quad (3)$$

A simple resistive circuit method is used to solve for the temperature gradient ΔT between the working fluid and the PCM, of a unit of length L, assuming the temperature of the outer surface containing the PCM is equal to the temperature of the charged PCM, prior to any discharge:

$$\frac{\dot{Q}}{\eta \cdot N} = \frac{\Delta T \cdot L}{R_{th}} \quad (4)$$

The total resistance $R_{th}$ from the outside of the PCM to the center of the heat transfer fluid tube considers the thermal conductivity of the tube material, $k_p$, thermal conductivity of the PCM, $k_{Al_{0.88}Si_{0.12}}$, and convection from the PCM to the working fluid flowing through the tube, $h_{conv}$.

$$R_{th} = \sum R_i = \frac{1}{h_{conv} \cdot \pi \cdot D_t} + \frac{\ln\left(\frac{D_i}{D_t}\right)}{2 \cdot \pi \cdot k_p} + \frac{\ln\left(\frac{D_o}{D_i}\right)}{2 \cdot \pi \cdot k_{AlSi12}} \quad (5)$$

The change in enthalpy of the water (Δh) is predetermined by the desired inlet temperature and outlet temperature of the fluid per tube. The mass flow rate per tube ($\dot{m}_t$) can be calculated through:

$$\dot{m}_t = \frac{\dot{Q}}{\eta \cdot \Delta h \cdot N} \quad (6)$$

By solving Eqs. (1-6) iteratively, an optimal design can be achieved according to the desired power output and energy storage requested of the conduction based system.

Another embodiment of the invention using radiative heat transfer will now be described.

Figure 12:
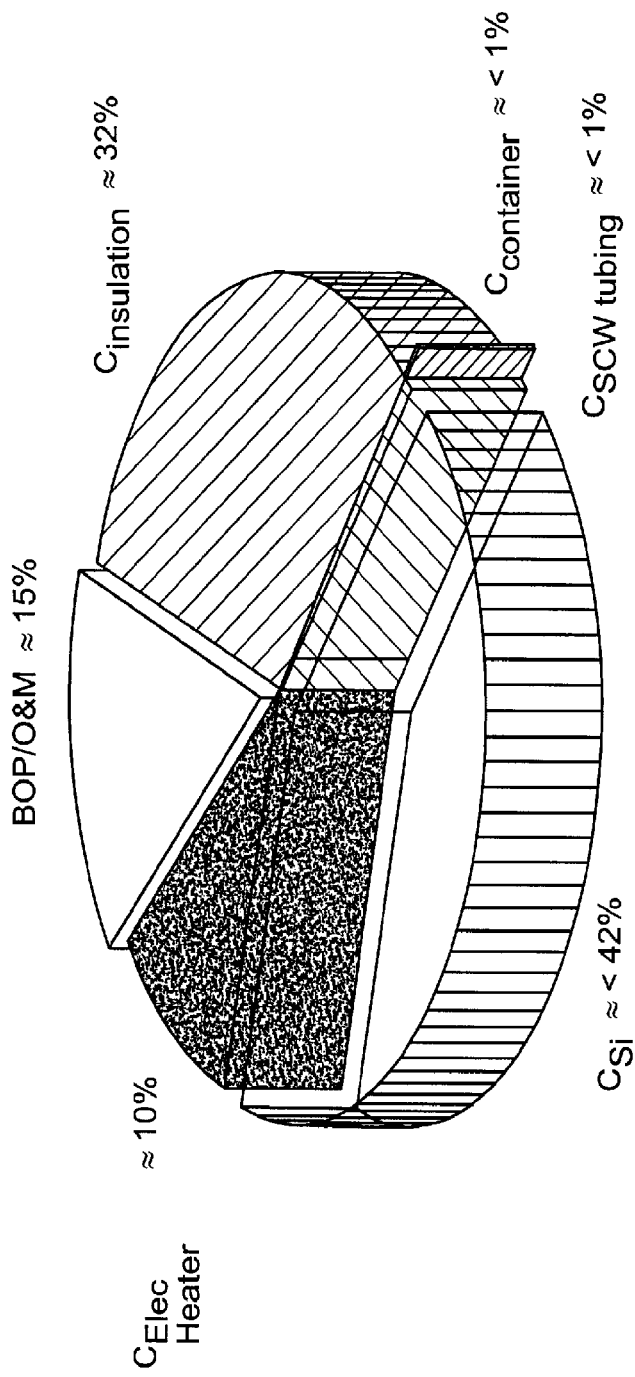
FIG. 12 is a pie chart detailing the cost break down of the invention disclosed herein based on radiation heat transfer with silicon as the storage medium.

FIG. 12 provides a cost breakdown of the radiation based invention disclosed herein, based on silicon as the thermal energy storage medium. Here, Elec Heater is the cost of electrical heaters, SCW tubing is the cost of 15CrMo steel for the heat transfer tubes, and BOP/O&M factors balance of plant and operations & maintenance fees.

Figure 13:
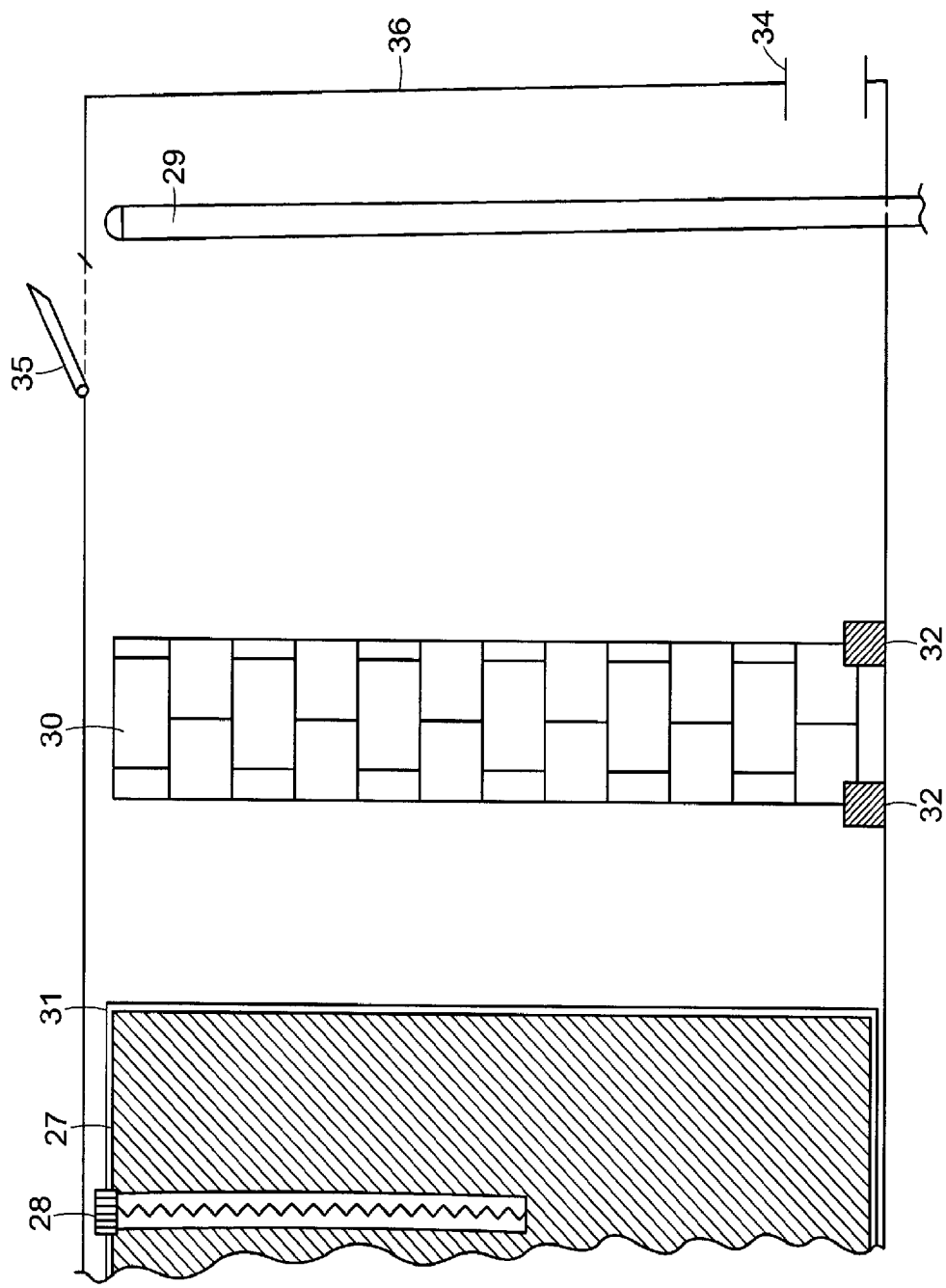
FIG. 13 is a view of an embodiment of the invention utilizing radiative heat transfer.

FIG. 13 is a vertical section of one embodiment of the invention, showing the overall vessel containing the thermal energy storage medium, insulation, tubing for heat transfer fluid, and vessel ports for pressure and temperature management. Electrical heating methods such as resistance heaters may be immersed within the thermal energy storage medium as shown, or induction heating or direct electrical heating may be implemented. Insulation is located between the storage medium and tubes during hours of storage, and removed during hours of energy release, allowing high radiative heat flux between the thermal energy storage medium and tubes.

Figure 14A:
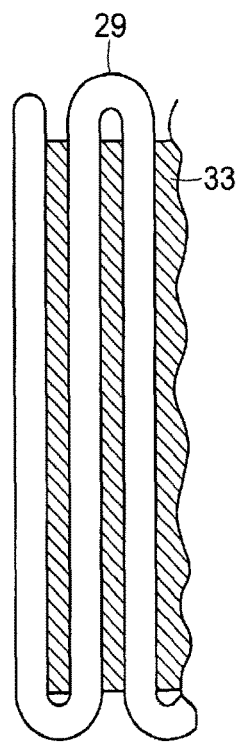
FIG. 14A is a sectional view of a portion of the structure shown in FIG. 13.

FIG. 14A is a vertical section showing the possible finned tube arrangement through which heat transfer fluid flows, allowing higher heat flux from the thermal energy storage medium to be transferred to said fluid by additional conduction heat transfer from the fins.

Figure 14B:
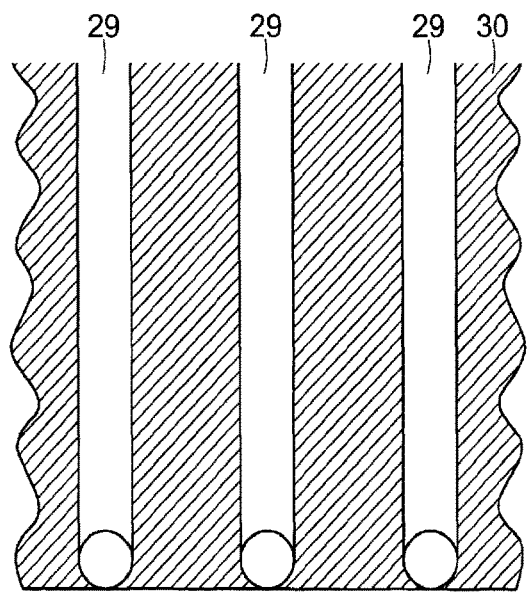
FIG. 14B is another embodiment of a sectional view of a portion of the structure shown in FIG. 13.

FIG. 14B is a vertical section showing yet another possible tube arrangement through which heat transfer fluid flows. Rather finned tubes, individual tubes may be placed between units of contained silicon. If contained silicon is not present on both sides of the tube, insulation or radiation barriers may be placed behind the tube(s).

Figure 15:
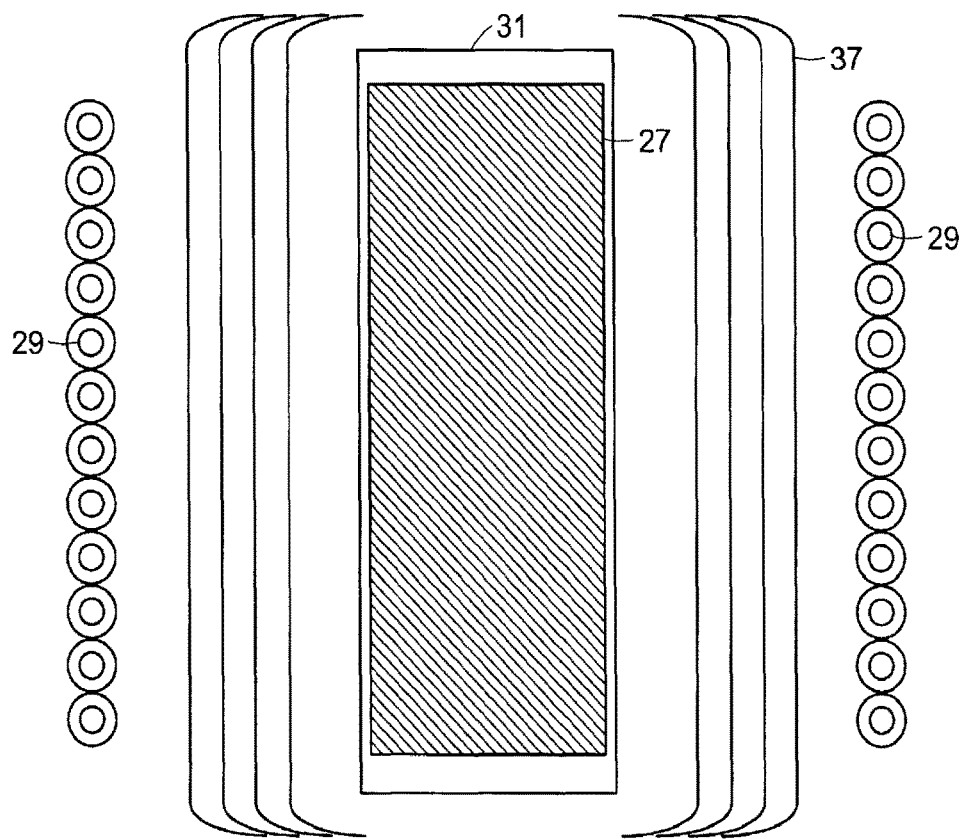
FIG. 15 is yet another embodiment of the invention utilizing radiative heat transfer and including radiation shields.

FIG. 15 illustrates the use of radiation shields, rather than insulation such as firebrick, between the thermal energy storage unit and the bank of tubes during times at which heat transfer fluid does not flow and the energy remains stored within the thermal energy storage medium. FIG. 15 is also a sectional top view of the system in FIG. 13, wherein the type of insulation of FIG. 13 and FIG. 15 are interchangeable.

Figure 16:
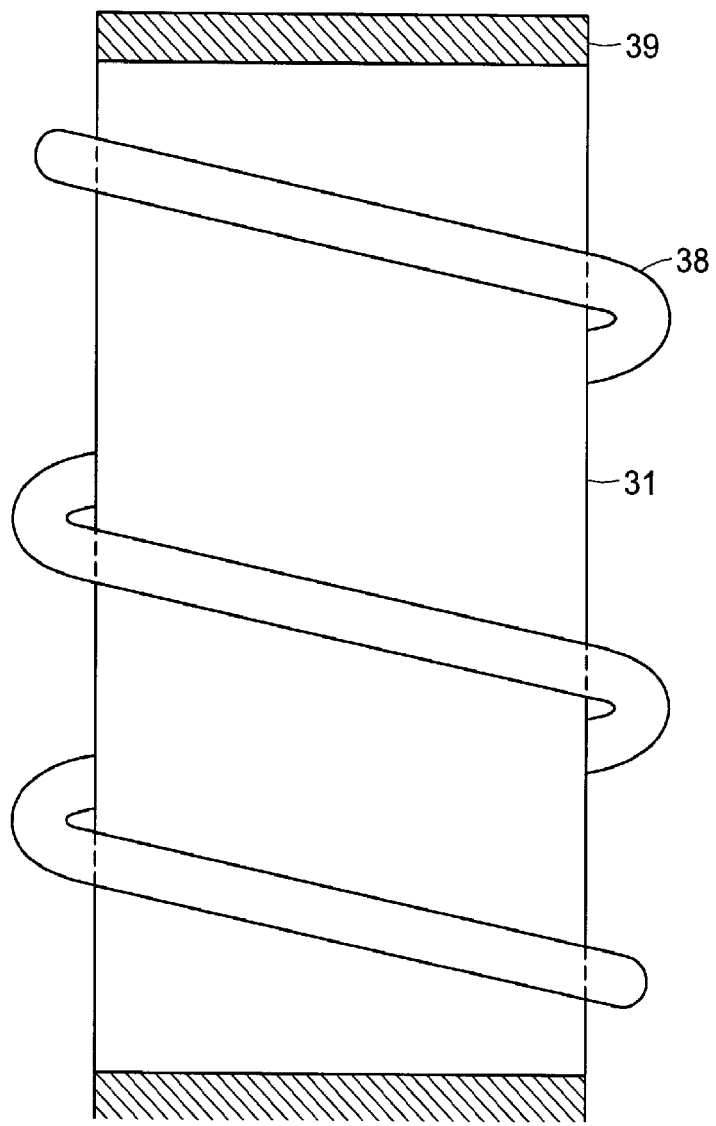
FIG. 16 is a perspective view of an embodiment of the invention utilizing radiative heat transfer and using induction heating.

FIG. 16 is a front view of the thermal energy storage system utilizing induction heating to convert electricity into thermal energy stored within the medium.

Figure 17:
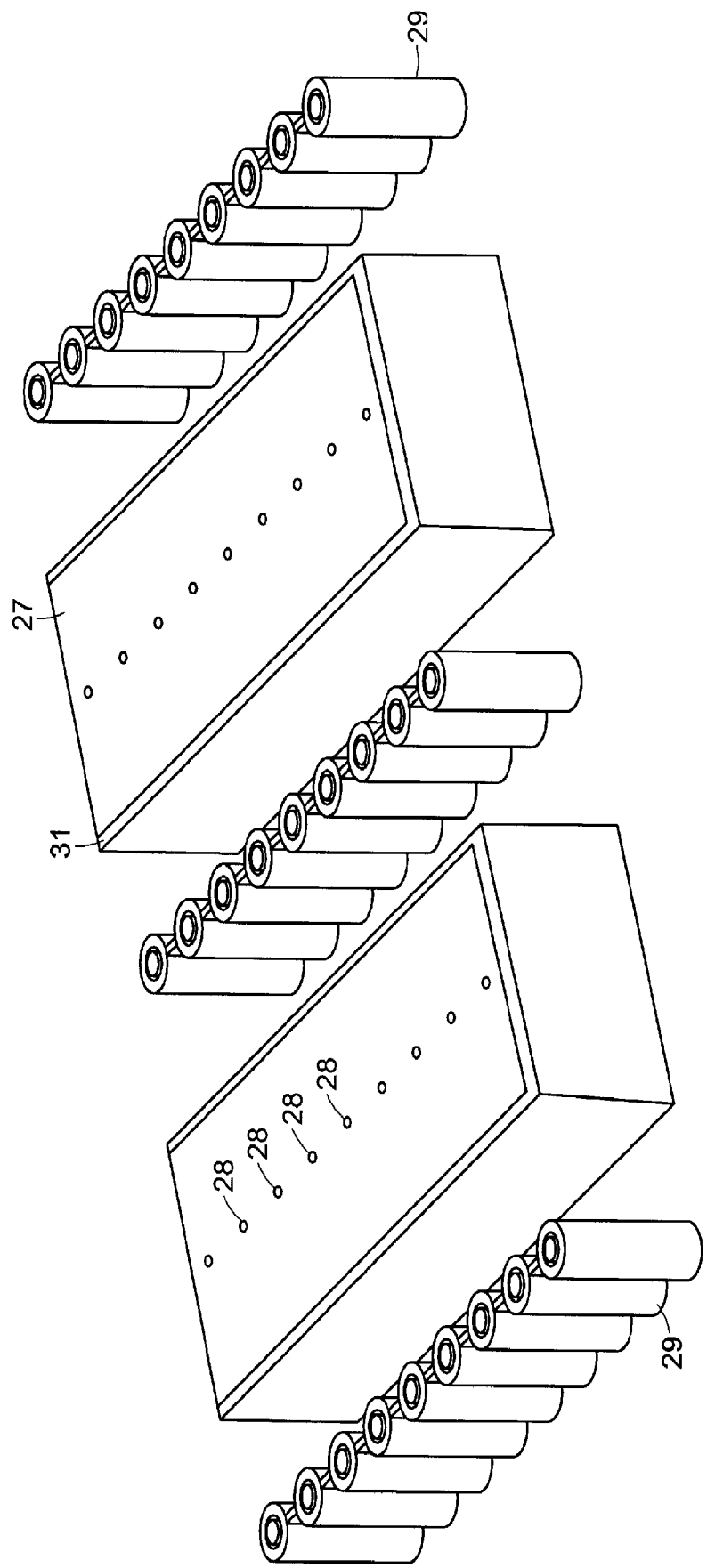
FIG. 17 is a perspective view of yet another embodiment of the thermal energy storage and release system with stacked capacity based on radiative heat transfer disclosed herein.

FIG. 17 is a perspective view illustrating one possible arrangement of the system in which banks of tubes are located between units of the thermal energy storage medium, with immersed electric heaters, allowing for additional capacity of the overall system. Units may also be stacked.

Figure 18:
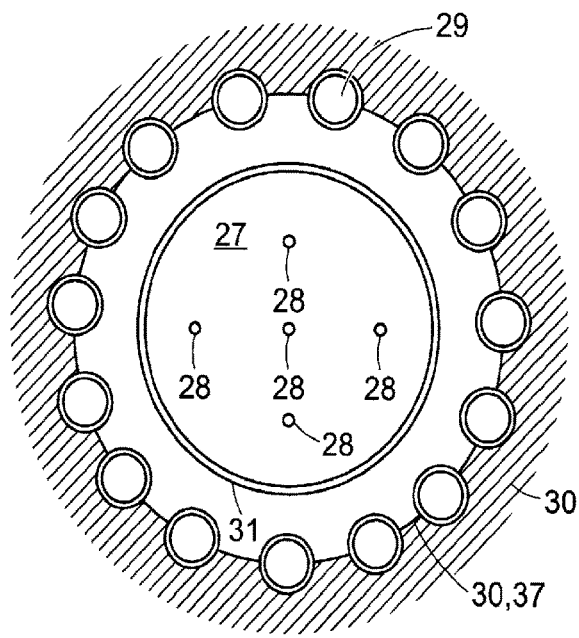
FIG. 18 is a top view of an embodiment of the invention utilizing radiative heat transfer in a cylindrical configuration.

FIG. 18 is a top view of another embodiment of the invention in which the silicon 27 is contained in a cylindrical enclosure 31, with electrical heaters 28 immersed within the silicon. Tubes 29 are circumferentially located around the container. The tubes may be finned, or there may be a radiation shield 37 or insulation 30 between the pipes. Insulation 30 surrounds the system to reduce heat loss. During times of active storage, insulation such as radiation shields are inserted between the container and ring of pipes.

Figure 19:
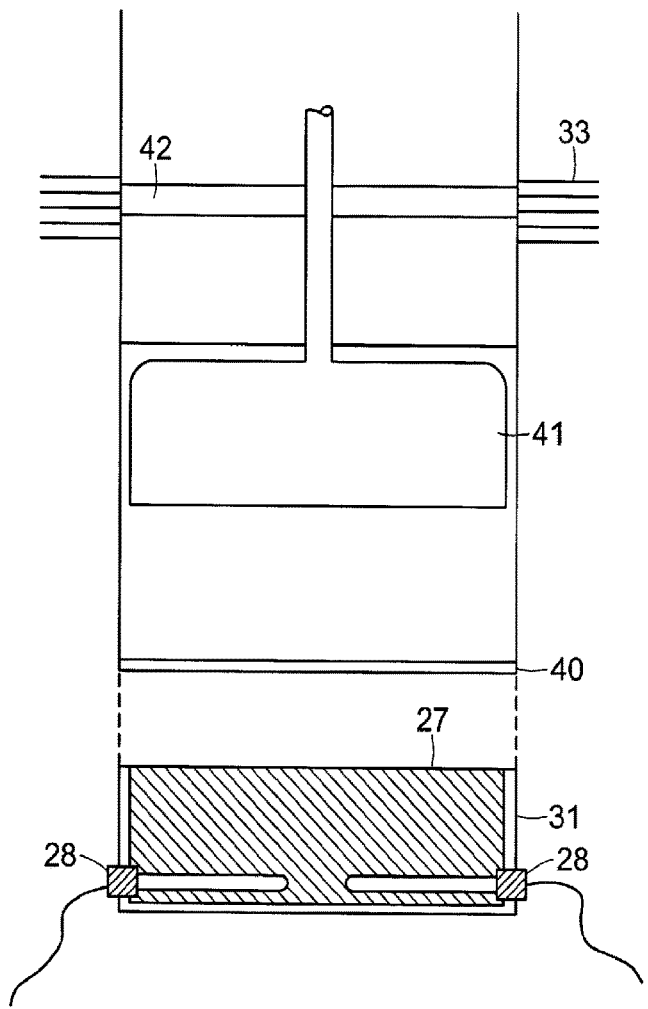
FIG. 19 is a cross-sectional view of yet another embodiment of the invention utilizing radiative heat transfer for a Stirling engine disclosed herein.

FIG. 19 is an example Stirling engine using a high temperature thermal energy storage medium such as silicon, to store thermal energy and heat the working fluid through radiative heat transfer. During hours of storage, insulation is inserted between the contained silicon 27 and absorber 40. Features in the drawings are not to scale.

Figure 20:
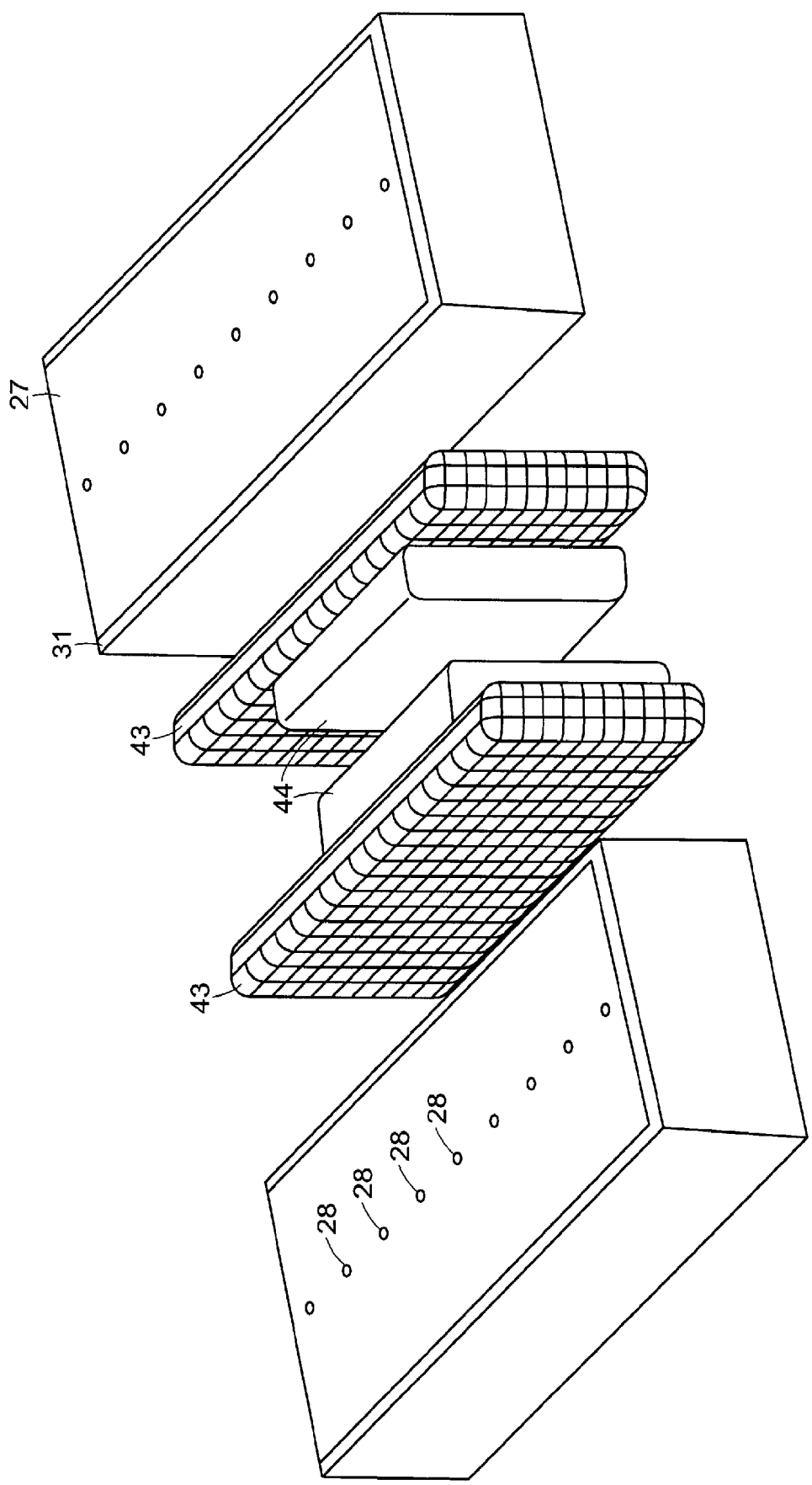
FIG. 20 is a perspective view of an embodiment of the invention disclosed herein utilizing thermophotovoltaics for heat-to-electricity generation.

FIG. 20 is a schematic of another embodiment of the invention disclosed herein where thermophotovoltaics are implemented as the heat-to-electricity generation device. Pipes or mesh may be inserted between the thermophotovoltaic and contained silicon to suppress natural convection. Rather thermophotovoltaics, or in conjunction to, any other heat-to-electricity generation device may be included between the contained silicon such as thermionic engines or electrochemical devices including thermogalvanics [36,37].

Figure 21:
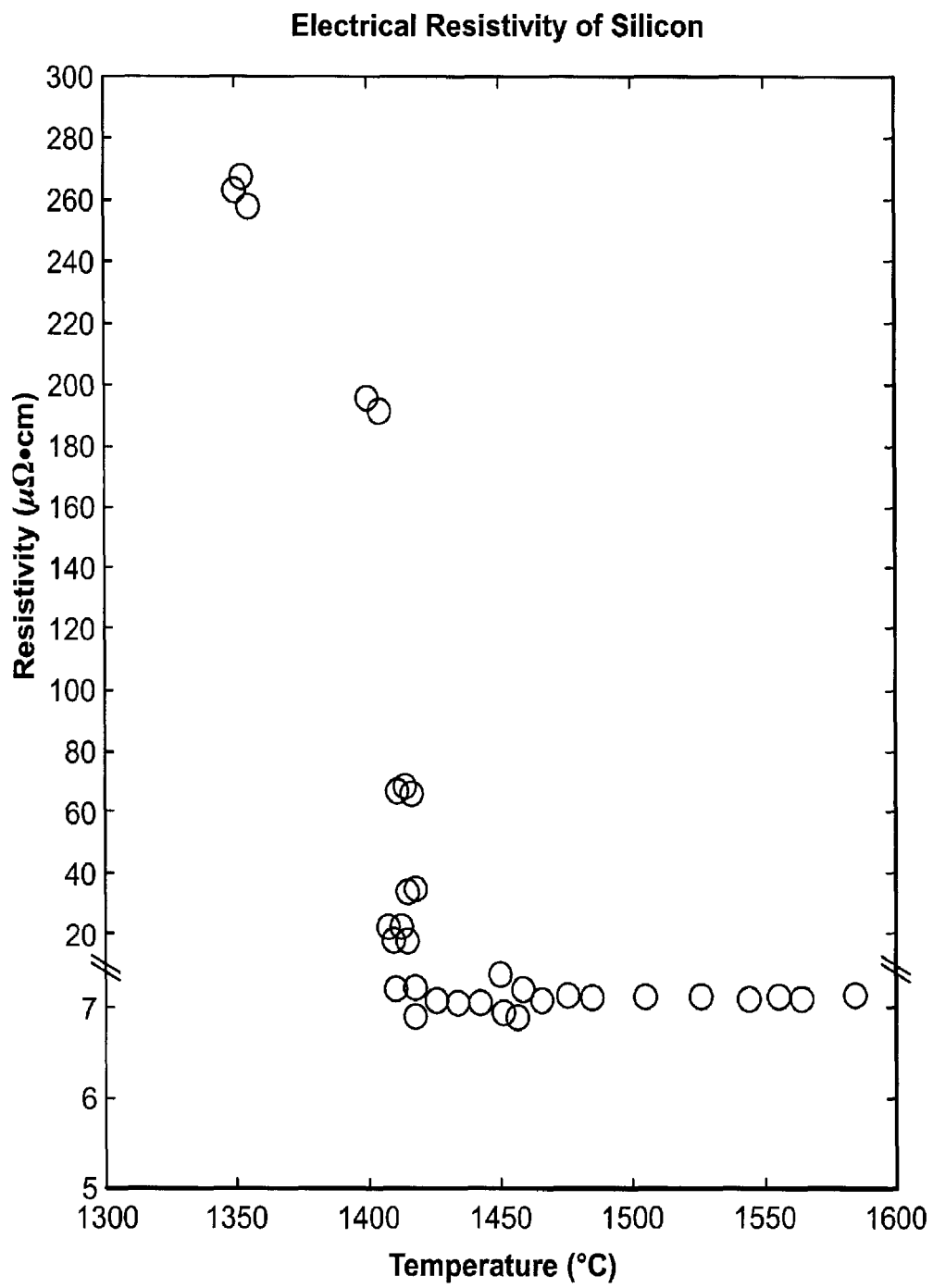
FIG. 21 is a graph of electrical resistivity versus temperature for elemental silicon.

FIG. 21 is the electrical resistivity of silicon from 1300☐ to 1600☐, capturing the resistivity upon phase change around 1414☐ [38].

In the example depicted in FIG. 13, the thermal energy release and storage system, abbreviated as TERS herein, produces supercritical water for an existing power plant which operates according to the supercritical Rankine cycle. The operation of the invention depicted in FIG. 13 may also operate within a nuclear power plant or operate according to the Brayton cycle. A Stirling engine coupled to TERS shall be introduced following the detailing of TERS coupled to a Rankine cycle. In one embodiment of TERS, the system consists of four main components: silicon 27 as the solid-liquid phase change medium; an electrical heater 28 converting electricity from the grid, renewable sources, or the power plant coupled to TERS, into thermal energy stored within the silicon; a bank of heat transfer tubes 29 in which fluid flows during hours of discharge; insulation 30 between the contained silicon and bank of tubes for hours of storage.

Silicon 27 is maintained near the solid-liquid phase change temperature of 1414° C. A container 31 contains the silicon 27 in a stationary configuration, as either a single unit of contained silicon or multiple units. The container 31 may be composed of one material which does not rapidly react with molten silicon, such as graphite with or without a protective outer layer to avoid oxidation, or multiple layers of materials. Possible materials for the container may be graphite, alumina, mullite, silicon carbide, aluminum nitride, or other materials stable at high temperatures. The presence of oxygen in the atmosphere surrounding the contained silicon may lead to oxidation, and thus the container should be designed accordingly. To circumvent issues with material oxidation, nitrogen purging of the area between the container and heat-to-electrical device may be implemented. Otherwise, a material resistant to oxidation must be used for the outer surface of the container.

The thickness of the container must also be designed such that it meets mechanical strength requirements, and yet does not create a prohibitively large temperature drop across the thickness. The chemical stability of the inner region of the container may be addressed in either of two methods: the inner lining of the container is resistant to corrosion by molten silicon; the container is maintained below the melting point of silicon such that a solid layer of silicon lines the inner surface of the container. The outer surface of the container should be composed of a material having a large emittance to allow for efficient thermal radiation from the container. In some embodiments, the silicon containers are sealed from the environment to minimize oxidation of silicon.

Furthermore, active cooling of the interface between the container and silicon may be implemented such that a solid layer of silicon, rather molten, is in contact with the container material greatly retarding the reaction rate between the container and silicon. This may be done if graphite is not the chosen material in contact with silicon. Graphite will react with silicon to form silicon carbide, which will not hinder the performance of the system. Rather active cooling, the system may be designed from a heat transfer perspective such that the inner container wall is below the melting point of silicon. For example, the thickness of silicon may be varied to optimize the desired interface temperature between the silicon and container. Further research must be done to determine the optimal container composition.

Unless the system is operating under vacuum pressure, a mechanism for the suppression of natural convection may be included between the contained silicon and the thermal energy receiving subsystem. For example, pipes or mesh may be between the silicon and thermal energy receiving subsystem. Such mechanism may be applied to all embodiments of the invention, enhancing radiative heat transfer between the storage unit and receiving subsystem.

Mobile insulation is translated into and out of the spaces between the contained silicon unit(s) and bank(s) of tubing through simple means such as wheels and axles 32 or an automated mechanical translation system. During hours of discharge, insulation 30 is translated out of view of the silicon unit. The dominant mode of heat transfer between the contained silicon 31 and tubes 29 is radiation. Pressurized water flows through the tubes 29. The silicon unit provides a heat flux to the heat transfer fluid tubes through two dominant paths: radiative flux from the silicon unit directly to the tube; and conduction from the fin 33 of the tube to the tube, in which the high temperatures of the fin 33 are due to the absorbed radiation from the silicon to the fin. The fins 33 of the tube are depicted in FIG. 14A. Pressurized water is convectively heated to supercritical temperatures within the tubes. The supercritical fluid is then sent to existing or new turbines of the power plant in which TERS is located. By using existing infrastructure, the capital cost as well as the footprint of TERS is minimized, thereby allowing for widespread adoption and ease of integration with existing power plants.

Rather a finned array of tubes, individual tubes 29 may be placed between the contained silicon units. If the tubes are not between two units of silicon, insulation or a radiation shield 30 may be placed behind the tubes as depicted in FIG. 14B to minimize heat loss.

The entire system is operated at ambient pressure (or near ambient) to minimize costs. In order to maintain ambient pressure, ports 34 are located at the bottom of the system vessel 36 by the row(s) of tube banks, which remain open to ambient pressure and temperature at all times. Thus, the air within the vessel will be stratified according to the density of air, with the cold air that enters from the lower port(s) 34 remaining at the lower half and hot air rising to the upper half of the vessel. During hours of storage, the insulation 30 is translated between the silicon unit(s) and tube bank(s), such that the radiative view factor between the silicon and tubes is essentially zero. Here, the tubes are composed of the same steel used in existing supercritical water boilers, and thus have a maximum operating temperature below the phase change temperature of silicon, around 700° C. Due to this temperature restriction, the tubes are convectively cooled during hours of storage. The coolant can be air or water. The latter can be part of the preheated feedwater for the regular fossil fuel-fired boiler. In other embodiments of TERS, cooling of the tubes is not necessary if the phase change temperature of the thermal energy storage medium is below the maximum operating temperature of the tubes, as is the case when using 15CrMo steel tubes and the eutectic alloy $Al_{0.12}Si_{0.88}$ as the phase change medium. In the example of FIG. 13 using silicon as the phase change medium, a secondary port 35 at the top of the vessel, located closest to the bank of tubes, is opened during hours of storage if natural convection cooling is used. Warm air within the vessel is displaced out of the top port 35 by cool air entering through the lower port 34. Through continuous displacement, natural ventilation is used to convectively cool the tubes, providing heat transfer according to $q=\rho c_p \dot{V} (T_{ss}-T_{ambient})$ where $\rho$ and $c_p$ are the density and specific heat capacity, respectively, of the air inside the vessel. The steady state temperature, $T_{ss}$, is a design parameter depending on the maximum operating temperature of the tubes, and $T_{ambient}$ is the temperature outside of the vessel. The volume flux of air displaced, $\dot{V}$, is provided by Gladstone and Woods [39]. The size of the top and bottom port must be designed such that enough heat is transferred from the tubes to the air to maintain the tubes at proper temperatures.

Operation of TERS may further be utilized for residential water heating or industrial processes. During hours of storage, rather than inducing natural convection by opening the ports located at the top of the vessel, water may flow through the tubes to cool them. Thus, useful thermal energy is recovered and utilized in low temperature applications. Such operation follows the same principles of a combined heat and power system, with the addition of energy storage. Water can also be used as the feedwater for the fossil fuel-fired boiler in the power plant. The same steam generation device can also provide steam to the steam turbines used in a nuclear power plant. Typically, nuclear power plants cannot accommodate large load changes. This device can enable a nuclear power plant to accommodate a wider range of load variation.

As mentioned, depicted in FIG. 14A, the bank of tubes 29 in which heat transfer fluid flows may be finned 33 to maximize heat transfer, and may be in a serpentine configuration such that mass flow rate of the heat transfer fluid is optimized with respect to heat transfer by forced convection and pumping power. The thickness and spacing of the fins are designed based on the desired heat flux from the fins to the tubes, which further depends on the power rating of the power plant, radiation heat transfer from the silicon to the fins, mass flow rate of the heat transfer fluid, etc.

In another embodiment of TERS, of which operation is consistent with the description above, the method of insulation may be optimized according to cost and efficiency. In reference to FIG. 15, in combination with, or in replacement of, insulation such as firebrick, high temperature radiation shields 37 e.g. Tantalum, 316 Stainless Steel, may be inserted between the contained silicon 27 and bank of tubes 29. The number of radiation shields used is dependent upon the temperature of the phase change material and the maximum operating temperature of the tubes, as well as design parameters such as combining insulation and radiation shields.

In yet another embodiment of TERS, of which operation is consistent with the description above, the system takes on a cylindrical geometry, as depicted in FIG. 18. By containing the silicon in a cylindrical vessel, areas of concentrated stress are minimized and the thermal expansion of silicon may be better addressed. If there are not multiple units of silicon and pipes located near each other, then insulation or radiation shields may surround the pipes. Otherwise, any radiation that is not absorbed by the pipes directly facing the silicon container may be absorbed by adjacent pipes belonging to a neighboring unit. The design of the pipes may also take on that of FIG. 14A & FIG. 14B. Insulation that may easily be inserted and removed vertically shall be placed between the contained silicon and ring of pipes during hours of active storage.

The three main advantages of the embodiments of TERS as described above and depicted in FIG. 13, FIG. 15, and FIG. 18 are: using silicon as a thermal energy storage medium and a high temperature heat source upon discharge of stored energy, allowing TERS to be coupled with high efficiency cycles such as that of supercritical water power plants; using high temperature phase change materials such as silicon to provide radiative heat transfer between the thermal energy storage unit and tubes, thereby eliminating safety concerns of high pressure fluids in contact with molten materials; electrical heating of the thermal energy storage medium, thereby allowing electricity produced by various energy sources to charge TERS such as wind turbines, photovoltaic farms or residential photovoltaic systems, fossil fuel power plants during times of low demand, excess electricity from the grid, etc. Immersed resistance heaters 28 are depicted in FIG. 13, however such a method of electrical heating is not the only method applicable to charging the thermal energy storage medium. As illustrated in FIG. 16, the phase change material may be charged by inductive heating 38 such that the heater is not in direct contact with the phase change material. This reduces potential complications such as material compatibility between the phase change medium and electrical heating elements. In all embodiments, but only depicted in FIG. 16 for ease of illustration, insulation 39 is placed on the outer top and bottom of the container 31 in which the phase change material is stored. Furthermore, electrical charging of silicon may be achieved by submerged electric arc heating, as done in the silicon smelter industry. Similarly, either a direct current or alternating current may be passed through the silicon, using electrode plates inserted along the sides of the contained silicon. Directly passing current through silicon is another method of heating. In all embodiments, the silicon units may be mobile such that once units have been completely discharged, said units may be switched with fully charged units if desired.

Radiation is received on both sides of the tubes 29 by inserting the tube banks between silicon units, as illustrated in FIG. 17. By conservation of energy, heat is transferred mainly by conduction through the silicon to the outer wall of the silicon container 31 according to Fourier's law, with the high latent heat of silicon and symmetry of configuration allowing for simplifications such that the heat transfer problem may be modeled as one-dimensional, $q''=-k\, dT/dx$ in which q" is the heat flux, k is the thermal conductivity of silicon, and dT/dx is the temperature gradient in the silicon from the center to the outer plane facing the tubes. This heat flux is then radiatively transferred from the outer container 31 surface to the tube banks, and transferred by natural convection between the container and tube banks. The dominant mode of heat transfer is radiation, and thus can be approximately solved by equating the heat flux by conduction to that by radiation, $$q'' = \frac{\sigma(T_1^4 - T_2^4)}{\frac{1-\varepsilon_1}{\varepsilon_1} + \frac{1}{F_{12}} + \frac{1-\varepsilon_2}{\varepsilon_2}}$$

in which $\sigma$ is the Stefan-Boltzmann constant, $T_1$ is the outer surface temperature of the silicon container, and $T_2$ is the temperature of the tube banks during discharge, or the temperature of the insulation during charging and storage. Likewise, $\varepsilon_1$ is the emissivity of the container outer surface, $F_{12}$ is the radiative view factor between the container and tube banks or insulation, and $\varepsilon_2$ is the emissivity of the tube banks or insulation. Said heat flux is transferred to the tubes themselves as well as the fins, if a finned tube configuration is chosen. The heat flux by the fins can be determined by modeling the fins as having an adiabatic tip, due to symmetry of the tube bank. Thus, the heat transfer from the fin to tube is $q=\sqrt{hPkA_c}\tan h(mL)(T_1-T_b)$ in which h is the non-linearized radiation coefficient, P is the perimeter of the fin, k is the thermal conductivity of the fin, $A_c$ is the cross-sectional area of the fin, and L is the length of the fin from the point of symmetry to the tube, all of which are design parameters. The variable m is the fin parameter, $m=\sqrt{hP/kA_c}$, and $T_1$ corresponds to the temperature of the container from which emission to the tubes originates. The fin may be composed of the same material as the tubes. The base temperature of the fin varies along the length of the tube in response to the variation in temperature of the heat transfer fluid flowing through the tubes. An increase in energy storage capacity and power generation may be achieved by either stacking the depicted units of contained silicon 27 and tube banks 29, or by the addition of rows of silicon units and tube banks. If individual tubes as displayed in FIG. 14B are inserted between silicon units, the total heat flux is simply that given by radiation as in the equation above, received on both sides of the tube. Thus the total heat transfer is $2q''\cdot A_1$ where $A_1$ is the surface area of the tube perpendicular to the silicon unit. If individual tubes as displayed in FIG. 14B are inserted facing one silicon unit, with the back side insulated, the total heat flux will be $q''\cdot A_1$ assuming perfection insulation. The collection of units and tubes are contained within a vessel open to atmospheric pressure, with insulation translated between the silicon units and tubes during hours of storage, as depicted in the section view of FIG. 13. By following similar calculations as provided in the example and incorporating the heat transfer equations to determine design parameters, the cost of the system can be estimated for a power plant rated for 600 $MW_e$ and an energy storage system capable of 12 hours of storage. For a power plant efficiency of 48%, the cost of the radiation based form of the invention disclosed herein is approximately ~8 USD $kWh_{th}^{-1}$ and ~16.7 USD $kWh_e$.

Due to the high temperatures achieved using molten silicon, TERS is not limited to operating with an existing supercritical water power plant. By harnessing radiative heat transfer from the high temperature silicon to an absorbing surface, TERS may be coupled with other power cycles such as the Stirling cycle. To illustrate such operation, an example Stirling engine coupled to TERS is depicted in FIG. 19. As in all embodiments of TERS, silicon 27 is charged through electrical means such as immersed resistance heaters 28. Silicon is contained 31 within close proximity of an absorber 40, to which the silicon 27 radiates. The backside of the absorber 40 is in thermal contact with the displacement cylinder within which is the displacer 41. As the silicon radiates to the absorber, gas within the displacement cylinder, e.g. air, is heated, expanding and thus displacing the displacement cylinder. The cycle of motion involving the displacer 41 and piston 42 follow that of any Stirling engine, with a typical cooling mechanism included such as using fins 33. The novel aspect of TERS coupled to a Stirling engine is the use of molten silicon as a heat source in which radiation is the dominant mode of heat transfer, as well as using silicon as a thermal energy storage medium, for an alpha, beta, or gamma type Stirling cycle.

Furthermore, various heat-to-electricity devices may be coupled to both the conduction based version of the invention disclosed herein or the radiation based version. Thermal energy may be transferred through either radiation or conduction or convection, or in combination, to various generators such as thermophotovoltaics, thermionics, thermogalvanics, and other electrochemical devices [24,37,40,41]. Thus, energy is stored within the phase change medium and transferred to the device for electricity generation during times of demand. An example of such operation of the invention is depicted in FIG. 20. Similar to FIG. 17 and FIG. 18, silicon 27 is contained 31 in rectangular or cylindrical units, with electrical heaters 28 immersed within the silicon. During hours of discharge, thermophotovoltaics 43,44 are in direct view of the silicon container. Radiation is received 43 and converted into electricity by the thermophotovoltaic. A method for dissipating heat 44 is included on the backside of the thermophotovotaic.

It is recognized that modifications and variations of the invention will be apparent to those of ordinary skill in the art and it is intended that all such modifications and variations be included within the scope of the appended claims. The contents of all of the references listed herein are incorporated by reference in their entirety.

REFERENCES

[1] A. Evans, V. Strezov, T. J. Evans, Assessment of utility energy storage options for increased renewable energy penetration, Renew. Sustain. Energy Rev. 16 (2012) 4141-4147. doi:10.1016/j.rser.2012.03.048.

[2] T. Kousskou, P. Bruel, a. Jamil, T. El Rhafiki, Y. Zeraouli, Energy storage: Applications and challenges, Sol. Energy Mater. Sol. Cells. 120 (2014) 59-80. doi:10.1016/j.solmat.2013.08.015.

[3] H. L. Ferreira, R. Garde, G. Fulli, W. Kling, J. P. Lopes, Characterisation of electrical energy storage technologies, Energy. 53 (2013) 288-298. doi:10.1016/j.energy.2013.02.037.

[4] B. Dunn, H. Kamath, J.-M. Tarascon, Electrical Energy Storage for the Grid: A Battery of Choices, Science (80-.). 334 (2011) 928-935. doi:10.1126/science.1212741.

[5] J. Bartels, Supercritical Pressure Steam Power Cycles, in: Proc. Am. Power Conf., Illinois Institute of Technology., 1954: p. 166.

[6] A. Henry, R. Prasher, The prospect of high temperature solid state energy conversion to reduce the cost of concentrated solar power, Energy Environ. Sci. 7 (2014) 1819-1828.

[7] J. Bugge, S. Kjær, R. Blum, High-efficiency coal-fired power plants development and perspectives, Energy. 31 (2006) 1437-1445.

[8] I. Pioro, S. Mokry, Thermophysical Properties at Critical and Supercritical Conditions, Heat Transf.—Theor. Anal. Exp. Investig. Ind. Syst. (2011) 573-592. doi:10.5772/13790.

[9] B. D. Iverson, T. M. Conboy, J. J. Pasch, A. M. Kruizenga, Supercritical CO 2 Brayton cycles for solar-thermal energy, Appl. Energy. 111 (2013) 957-970.

[10] F. A. Al-Sulaiman, M. Atif, Performance comparison of different supercritical carbon dioxide Brayton cycles integrated with a solar power tower, Energy. 82 (2015) 61-71.

[11] L. A. Weinstein, J. Loomis, B. Bhatia, D. M. Bierman, E. N. Wang, G. Chen, Concentrating Solar Power, Chem. Rev. 115 (2015) 12797-12838. http://dx.doi.org/10.1021/acs.chemrev.5b00397 (accessed Oct. 29, 2015).

[12] M. Nicolosi, Wind power integration and power system flexibility—An empirical analysis of extreme events in Germany under the new negative price regime, Energy Policy. 38 (2010) 7257-7268.

[13] F. Genoese, M. Genoese, M. Wietschel, Occurrence of negative prices on the German spot market for electricity and their influence on balancing power markets, in: Energy Mark. (EEM), 2010 7th Int. Conf. Eur., IEEE, 2010: pp. 1-6.

[14] F. Paraschiv, D. Erni, R. Pietsch, The impact of renewable energies on EEX day-ahead electricity prices, Energy Policy. 73 (2014) 196-210.

[15] E. Fanone, A. Gamba, M. Prokopczuk, The case of negative day-ahead electricity prices, Energy Econ. 35 (2013) 22-34.

[16] C. Forsberg, Hybrid systems to address seasonal mismatches between electricity production and demand in nuclear renewable electrical grids, Energy Policy. 62 (2013) 333-341.

[17] A. Gil, M. Medrano, I. Martorell, A. L??zaro, P. Dolado, B. Zalba, L. F. Cabeza, State of the art on high temperature thermal energy storage for power generation. Part 1-Concepts, materials and modellization, Renew. Sustain. Energy Rev. 14 (2010) 31-55. doi:10.1016/j.rser.2009.07.035.

[18] U. Herrmann, M. Geyer, D. Kearney, Overview on Thermal Storage Systems Why storage?·Cost reduction for solar generated electricity·Improve availability of solar power plants, 2002.

[19] Z. Wang, H. Wang, X. Li, D. Wang, Q. Zhang, G. Chen, Z. Ren, Aluminum and silicon based phase change materials for high capacity thermal energy storage, Appl. Therm. Eng. 89 (2015) 204-208.

[20] L. Moens, D. M. Blake, D. L. Rudnicki, M. J. Hale, Advanced Thermal Storage Fluids for Solar Parabolic Trough Systems, J. Sol. Energy Eng. 125 (2003) 112. doi:10.1115/1.1531644.

[21] X. Wang, J. Liu, Y. Zhang, H. Di, Y. Jiang, Experimental research on a kind of novel high temperature phase change storage heater, Energy Conyers. Manag. 47 (2006) 2211-2222. doi:10.1016/j.enconman.2005.12.004.

[22] T. Hibiya, H. Fukuyama, T. Tsukada, M. Watanabe, Thermophysical Properties of Molten Silicon, in: Cryst. Growth Technol., Wiley-VCH Verlag GmbH & Co. KGaA, 2008: pp. 103-136. doi:10.1002/9783527623440.ch4.

[23] Hamburg, Siemens presents thermal storage solution for wind energy, (2016). https://www.siemens.com/press/PR2016090419WPEN.

[24] A. Datas, A. Ramos, A. Martí, C. del Cañizo, A. Luque, Ultra high temperature latent heat energy storage and thermophotovoltaic energy conversion, Energy. 107 (2016) 542-549.

[25] 1414 degrees, (n.d.). http://1414degrees.com.au/.

[26] U. Herrmann, B. Kelly, H. Price, Two-tank molten salt storage for parabolic trough solar power plants, Energy. 29 (2004) 883-893. doi:10.1016/S0360-5442(03)00193-2.

[27] Z. Y. Liu, Annual report on the development of China's electric power industry, 2011.

[28] G. Xu, S. Huang, Y. Yang, Y. Wu, K. Zhang, C. Xu, Techno-economic analysis and optimization of the heat recovery of utility boiler flue gas, Appl. Energy. 112 (2013) 907-917.

[29] G. Towler, R. Sinnott, Chemical Engineering Design, 2nd ed., 2012.

[30] J. Kotze, T. Von Backstrom, P. Erens, Evaluation of a latent heat thermal energy storage system using AlSi12 as a phase change material, Marrakesch: SolarPACES. (2012) 1-7. http://blogs.sun.ac.za/sterg/files/2010/11/Kotze-Storage.pdf.

[31] J. Kotzé, T. Von Backström, P. Erens, A Combined Latent Thermal Energy Storage and Steam Generator Concept Using Metallic Phase Change Materials and Metallic Heat Transfer Fluids for Concentrated Solar, (2011). http://www.crses.sun.ac.za/files/services/conferences/annual-student-symposium-2011/5-18nov_kotze.pdf.

[32] R. Brandt, G. Neuer, Electrical resistivity and thermal conductivity of pure aluminum and aluminum alloys up to and above the melting temperature, Int. J. Thermophys. 28 (2007) 1429-1446. doi:10.1007/s10765-006-0144-0.

[33] Q. He, W. N. Zhang, a Study on Latent Heat Storage Exchangers With the High Temperature Pcm, World Renew. Energy Congr. VI. (2000) 1044-1047. doi:10.1002/er.683.

[34] T. E. I. Hunt, Arlon J., Liquid Metal Thermal Storage System and Method, 2005.

[35] M. Fabbri, M. Forzan, S. Lupi, a Morandil, P. L. Ribani, Experimental and Numerical Analysis of {DC} Induction Heating of Aluminum Billets, Ieee Trans. Magn. 45 (2009) 192-200. doi:Article.

[36] Z. Yang, J. Zhang, M. C. W. Kintner-Meyer, X. Lu, D. Choi, J. P. Lemmon, J. Liu, Electrochemical energy storage for green grid, Chem. Rev. 111 (2011) 3577-3613. doi:10.1021/cr100290v.

[37] V. C. Wilson, Conversion of heat to electricity by thermionic emission, J. Appl. Phys. 30 (1959) 475-481.

[38] H. S. and A. I. and K. T. and S. Kimura, Temperature Dependence of the Electrical Resistivity of Molten Silicon, Jpn. J. Appl. Phys. 34 (1995) 3426. http://stacksiop.org/1347-4065/34/i=7R/a=3426.

[39] C. Gladstone, A. W. Woods, On buoyancy-driven natural ventilation of a room with a heated floor, J. Fluid Mech. 441 (2001) 293-314.

[40] J. W. Schwede, I. Bargatin, D. C. Riley, B. E. Hardin, S. J. Rosenthal, Y. Sun, F. Schmitt, P. Pianetta, R. T. Howe, Z.-X. Shen, N. A. Melosh, Photon-enhanced thermionic emission for solar concentrator systems, Nat Mater. 9 (2010) 762-767. http://dx.doi.org/10.1038/nmat2814.

[41] H. L. Chum, R. A. Osteryoung, Review of thermally regenerative electrochemical systems, Solar Energy Research Inst., Golden, Colo. (USA); State Univ. of New York, Buffalo (USA), 1981.

What is claimed is:

1. A system for storage, release, and reception of thermal energy comprising:
a unit for containing at least one thermally conducting phase change material;
electrical circuitry to electrically heat the phase change material into a molten state;
a mechanism through which the release of thermal energy is induced;
a receiving subsystem having at least one tube configured to have a working fluid flow therethrough such that thermal energy is transformed into electrical energy; and
structure that includes at least a portion of the unit for containing at least one thermally conducting phase change material and at least a portion of the at least one tube, with a space extending between the at least a portion of the unit for containing at least one thermally conducting phase change material and the at least a portion of the at least one tube such that transferring heat in the phase change material to the receiving subsystem is configured to occur primarily by radiative heat transfer.

2. The system of claim 1, wherein the electrical circuitry drives current through one or more electrical heaters to heat the phase change material.

3. The system of claim 2, wherein the one or more electrical heaters transfer heat to the phase change material primarily through one of radiation and conduction.

4. The system of claim 3, wherein the system is configured to be operably associated with at least one of a power plant and an electrical grid to share at least one of the one or more steam turbines or the one or more gas turbines for electricity generation, the power plant being one of a pre-existing power plant and a new power plant, and the electrical grid being one of a pre-existing electrical grid and a new electrical grid.

5. The system of claim 1, further comprising the working fluid, the working fluid generating at least one of: (1) high pressure, high temperature steam for electricity generation in one or more steam turbines; or (2) gas for electrical generation in one or more gas turbines.

6. The system of claim 1, wherein the thermal energy receiving subsystem includes a direct energy conversion device to convert a portion of the released heat into electricity.

7. The system of claim 1, wherein the at least one tube includes a bank of tubes or a single tube and the heat transfer from the phase change material is to the bank of tubes or the single tube within which the working fluid flows.

8. The system of claim 1, further comprising the working fluid, the working fluid being a working gas and the heat transfer receiving subsystem is a Stirling engine in which an absorber is in intimate thermal contact with the working gas and wherein the absorber is heated radiatively by the phase change material.

9. The system of claim 1, wherein the phase change material is an aluminum-silicon alloy $Al_xSi_{1-x}$ or elemental silicon.

10. The system of claim 1, wherein the mechanism through which the release of thermal energy is induced comprises moveable thermal insulators disposed in the space between the unit for containing at least one thermally conducting phase change material and the at least one tube.

11. The system of claim 1, wherein the system is connected to an energy source comprising at least one of an electrical grid, one or more photovoltaic panels, one or more generators from a power plant, or one or more wind turbines, and the phase change material is electrically heated using electricity form the energy source.

12. The system of claim 11, wherein the system is configured to monitor and regulate an amount of electricity used from the energy source to electrically heat the phase change material and an amount of the electrical energy transformed by the receiving subsystem for subsequent use.

13. A system for storage, release, and reception of thermal energy, comprising:
a storage subsystem for containing at least one thermally conducting phase change material;
electrical circuitry to electrically heat the phase change material into a molten state;
a receiving subsystem in which thermal energy is transformed into electrical energy;
a mechanism through which the release of thermal energy is induced, the mechanism including at least one moveable thermal insulator disposed in a space between the storage subsystem and the receiving subsystem; and
structure for transferring heat in the phase change material to the receiving subsystem,
wherein the at least one moveable thermal insulator is translated into and out of the space by at least one of: (1) wheels and axles; or (2) a mechanical translation system.

14. The system of claim 13, wherein the electrical circuitry drives current through one or more electrical heaters to heat the phase change material.

15. The system of claim 14, wherein the one or more electrical heaters transfer heat to the phase change material primarily through one of radiation and conduction.

16. The system of claim 13, wherein the thermal energy receiving subsystem includes at least one of: (1) a working fluid to generate high pressure, high temperature steam for electricity generation in one or more steam turbines; or (2) a working fluid to generate gas for electrical generation in one or more gas turbines.

17. The system of claim 13, wherein the thermal energy receiving subsystem includes a direct energy conversion device to convert a portion of the released heat into electricity.

18. The system of claim 13, wherein the heat transfer from the phase change material is to a bank of tubes or single tube within which a working fluid flows.

19. The system of claim 13, wherein the heat transfer receiving subsystem is a Stirling engine in which an absorber is in intimate contact with a working gas and wherein the absorber is heated radiatively by the phase change material.

20. The system of claim 13, wherein the structure for transferring heat in the phase change material to the receiving subsystem does so primarily by radiative heat transfer.

21. The system of claim 20, wherein the heat transfer from the phase change material is to a bank of tubes or single tube within which a working fluid flows.

22. The system of claim 13, wherein the phase change material is an aluminum-silicon alloy $Al_xSi_{1-x}$ or elemental silicon.

23. The system of claim 13, wherein the system is connected to an energy source comprising at least one of an electrical grid, one or more photovoltaic panels, one or more generators from a power plant, or one or more wind turbines, and the phase change material is electrically heated using electricity from the energy source.

24. The system of claim 23, wherein the system is configured to monitor and regulate an amount of electricity used from the energy source to electrically heat the phase change material and an amount of the electrical energy transformed by the receiving subsystem for subsequent use.

25. The system of claim 13, wherein the system is configured to be operably associated with a power plant and an electrical grid to share at least one of the one or more steam turbines or the one or more gas turbines for electricity generation, the power plant being one of a pre-existing power plant and a new power plant, and the electrical grid being one of a pre-existing electrical grid and a new electrical grid.

* * * * *